United States Patent
Adams et al.

(10) Patent No.: US 10,119,987 B2
(45) Date of Patent: Nov. 6, 2018

(54) MEASURING ACCELERATION USING INTERFEROMETRY WITH REDUCED ENVIRONMENTAL EFFECTS

(71) Applicants: Robert W. Adams, Houston, TX (US); Carl M. Edwards, Katy, TX (US); Sebastian Csutak, Houston, TX (US); Felix Wellmann, Ronnenberg (DE); Otto Fanini, Houston, TX (US)

(72) Inventors: Robert W. Adams, Houston, TX (US); Carl M. Edwards, Katy, TX (US); Sebastian Csutak, Houston, TX (US); Felix Wellmann, Ronnenberg (DE); Otto Fanini, Houston, TX (US)

(73) Assignee: BAKER HUGHES, A GE COMPANY, LLC, Houston, TX (US)

(*) Notice: Subject to any disclaimer, the term of this patent is extended or adjusted under 35 U.S.C. 154(b) by 297 days.

(21) Appl. No.: 15/007,752

(22) Filed: Jan. 27, 2016

(65) Prior Publication Data
US 2017/0212144 A1    Jul. 27, 2017

(51) Int. Cl.
*G01P 15/08*   (2006.01)
*G01P 15/13*   (2006.01)
(Continued)

(52) U.S. Cl.
CPC .............. *G01P 15/03* (2013.01); *G01P 1/006* (2013.01); *G01V 7/00* (2013.01)

(58) Field of Classification Search
CPC ......... G01P 15/03; G01P 15/032; G01V 7/00; G01B 9/02027; G01B 9/02015
(Continued)

(56) References Cited

U.S. PATENT DOCUMENTS

| 5,767,972 A * | 6/1998 | Demarest ............... G01J 3/45 |
| | | 356/487 |
| 7,245,382 B2 * | 7/2007 | Ronnekleiv ........ G01B 9/02007 |
| | | 356/477 |

(Continued)

FOREIGN PATENT DOCUMENTS

JP    2015143686 A    8/2015

OTHER PUBLICATIONS

Authors: M A Rodríguez Ávila et al, Title: High precision speed measurement by using interferometric techniques, Date: 2015, Publisher: VII International Congress of Engineering Physics—IOP Publishing, Journal of Physics, Conference Series 582, pp. 1-6.*

(Continued)

*Primary Examiner* — Lisa Caputo
*Assistant Examiner* — Roger Hernandez-Prewit
(74) *Attorney, Agent, or Firm* — Cantor Colburn LLP

(57) ABSTRACT

An apparatus for measuring acceleration includes: a reference cavity having a first fixed reflecting surface and a second fixed reflecting surface; a sense cavity having a fixed reflecting surface and a non-fixed reflecting surface, the non-fixed reflecting surface being configured to be displaced when subject to an acceleration force; a light source to illuminate the reference and sense cavities; a controller to vary a wavelength of light emitted by the light source and/or an index of refraction of an optical medium of the cavities; a photodetector to detect light emitted by the reference and sense cavities; an interferometer sensor to measure using the detected light, for each variation of the wavelength of light and/or the index of refraction a reference displacement of the reference cavity and a sense displacement of the sense cavity; and a processor to calculate the acceleration using each of the reference displacements and the sense displacements.

29 Claims, 10 Drawing Sheets

(51) Int. Cl.
*G01P 15/03* (2006.01)
*G01P 1/00* (2006.01)
*G01V 7/00* (2006.01)

(58) Field of Classification Search
USPC ............... 73/514.26, 653; 356/482, 486, 498
See application file for complete search history.

(56) References Cited

U.S. PATENT DOCUMENTS

| | | |
|---|---|---|
| 2006/0192974 A1 | 8/2006 | Li |
| 2009/0109445 A1 | 4/2009 | Carr et al. |
| 2013/0327146 A1 | 12/2013 | Meyer et al. |
| 2015/0115145 A1 | 4/2015 | Edwards |

OTHER PUBLICATIONS

Authors: H. Baumann et al., Title: Experimental assessment of the speed of light perturbation in free-fall absolute gravimeters, Date: Jul. 5, 2015, pp. total: 13.*

Baird, et al.; "One-Step Neural Network Inversion with PDF Learning and Emulation"; 2005; IEEE International Joint Conference; 6 pages.

Dariu, et al.; "D-16 Multicomponent Avo Inversion Using Simulated Annealing";Eage 65th Conference & Exhibition—Stavanger, Norway, Jun. 2-5, 2003; 4 pages.

International Search Report and the Written Opinion of the International Searching Authority; PCT/US2017/014929; Korean Intellectual Property Office; dated Apr. 28, 2017; 11 pages.

* cited by examiner

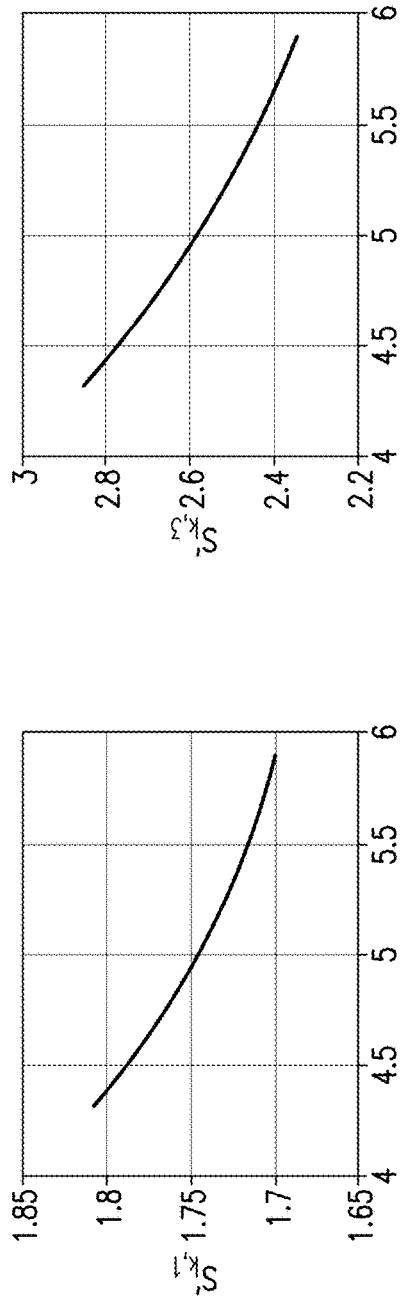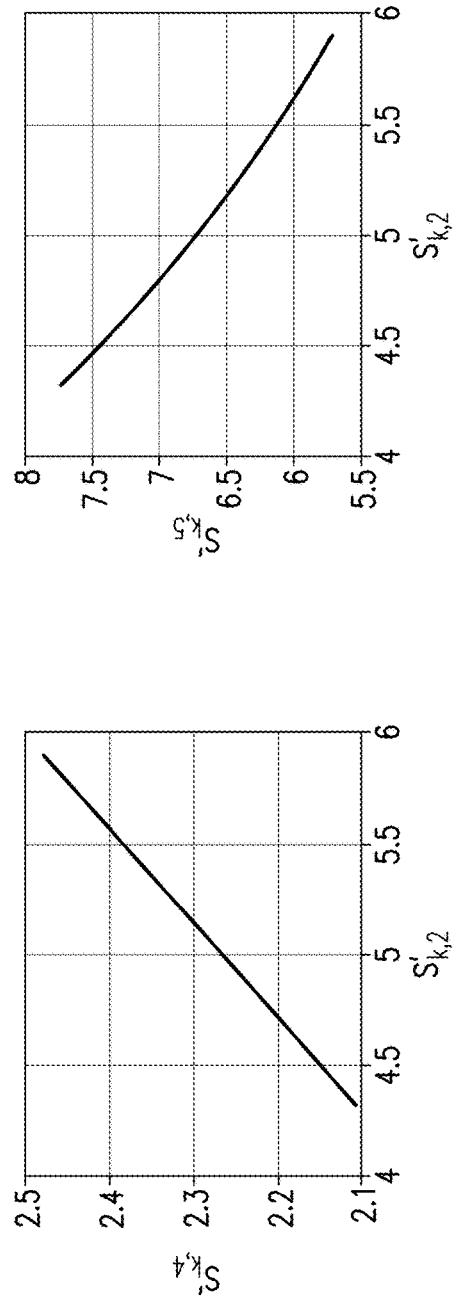
FIG. 10A
FIG. 10B
FIG. 10C
FIG. 10D

MEASURING ACCELERATION USING INTERFEROMETRY WITH REDUCED ENVIRONMENTAL EFFECTS

BACKGROUND

There are many applications for accelerometers used beneath the surface of the earth. In one application, accelerometers are attached to a drill string having a drill bit for drilling a borehole into the earth. The accelerometers can measure vibrations that may cause equipment damage or slow down the rate of penetration and thus be used adjust drilling parameters to reduce vibrations.

In another subsurface application, an accelerometer with increased sensitivity may be used as a gravimeter to measure gravitational force and thus gravitational acceleration. By sensing gravitational acceleration below the surface of the earth, various properties of a reservoir can be sensed for reservoir management purposes.

One challenge faced by instruments disposed deep within the earth is high temperature, which can meet or exceed 200° C. The high temperature can cause an accelerometer to fail or provide inaccurate measurements. Hence, improvements to accelerometers for subsurface applications would be well received in the drilling and hydrocarbon production industries.

BRIEF SUMMARY

Disclosed is an apparatus for measuring acceleration. The apparatus includes: a reference cavity having an optical medium and a first fixed reflecting surface and a second fixed reflecting surface disposed a distance $d_{REF}$ from the first fixed reflecting surface; a sense cavity having the optical medium and a fixed reflecting surface and a non-fixed reflecting surface disposed a distance $d_{SENSE}$ from the fixed reflecting surface; the non-fixed reflecting surface being configured to be displaced when subject to an acceleration force; a light source configured to illuminate the reference cavity and the sense cavity; a controller configured to vary a wavelength of light emitted by the light source and/or an index of refraction of the optical medium; a photodetector configured to detect light emitted by the reference cavity and the sense cavity; an interferometer sensor configured to measure using the light detected by the photodetector, for each variation of the wavelength of light emitted by the light source and/or the index of refraction of the optical medium, (a) a reference displacement of the first fixed reflecting surface with respect to the second fixed reflecting surface in the reference cavity and (b) a sense displacement of the fixed reflecting surface with respect to the non-fixed reflecting surface in the sense cavity; and a processor configured to calculate the acceleration using each of the reference displacements and the sense displacements.

Also disclosed is a downhole apparatus for measuring acceleration. The downhole apparatus includes: a carrier configured to be conveyed through a borehole penetrating the earth; a control volume disposed on the carrier; a reference cavity disposed in the control volume and having an optical medium and a first fixed reflecting surface and a second fixed reflecting surface disposed a distance $d_{REF}$ from the first fixed reflecting surface; a sense cavity disposed in the control volume and having the optical medium and a fixed reflecting surface and a non-fixed reflecting surface disposed a distance $d_{SENSE}$ from the fixed reflecting surface; the non-fixed reflecting surface being configured to be displaced when subject to an acceleration force; a laser light source configured to illuminate the reference cavity and the sense cavity; a photodetector configured to detect light emitted by the reference cavity and the sense cavity; a gas cell configured to provide a reference wavelength of light to the laser light source; a master clock configured to output a master time signal; a synchronous controller configured to (a) vary a wavelength of light emitted by the light source and/or an index of refraction of the optical medium and (b) synchronize with the master time signal; a plurality of reference sensors configured to sense properties of the control volume; a calibrator configured to apply a stimulus of known magnitude to the sense cavity that results in a change in $d_{SENSE}$ for providing a calibration response; an interferometer sensor configured to measure using the light detected by the photodetector, for each variation of the wavelength of light emitted by the light source and/or the index of refraction of the optical medium, (a) a reference displacement of the first fixed reflecting surface with respect to the second fixed reflecting surface in the reference cavity and (b) a sense displacement of the fixed reflecting surface with respect to the non-fixed reflecting surface in the sense cavity; a synchronous processor configured to (a) synchronize with the master time signal, (b) calculate the acceleration using each of the first displacements and the second displacements, the properties sensed by the reference sensors, and the calibration response; memory configured to store the calculated acceleration; and a communication device configured to transmit the calculated acceleration stored in the memory uphole towards the surface of the earth.

Further disclosed is a method for measuring acceleration. The method includes: using a reference cavity having an optical medium and a first fixed reflecting surface and a second fixed reflecting surface disposed a distance $d_{REF}$ from the first fixed reflecting surface; using a sense cavity having the optical medium and a fixed reflecting surface and a non-fixed reflecting surface disposed a distance $d_{SENSE}$ from the fixed reflecting surface, the non-fixed reflecting surface being configured to be displaced when subject to an acceleration force; illuminating the reference cavity and the sense cavity with a light source that is configured to emit light at one or more wavelengths; varying a wavelength of light emitted by the light source and/or an index of refraction of the optical medium with a controller; detecting light emitted by the reference cavity and the sense cavity using a photodetector; measuring with an interferometer sensor using the light detected by the photodetector, for each variation of the wavelength of light emitted by the light source and/or the index of refraction of the optical medium, (a) a reference displacement of the first fixed reflecting surface with respect to the second fixed reflecting surface in the reference cavity and (b) a sense displacement of the fixed reflecting surface with respect to the non-fixed reflecting surface in the sense cavity; and calculating with a processor the acceleration using each of the reference displacements and the sense displacements.

BRIEF DESCRIPTION OF THE DRAWINGS

The following descriptions should not be considered limiting in any way. With reference to the accompanying drawings, like elements are numbered alike:

FIGS. 10A-10D, collectively referred to as FIG. 10, depict aspects of a relative sign of a phase due to a change in a cavity's size due to fluctuations of a measured property;

DETAILED DESCRIPTION

A detailed description of one or more embodiments of the disclosed apparatus and method presented herein by way of exemplification and not limitation with reference to the figures.

Disclosed are apparatus and method for measuring acceleration including gravitational acceleration. In particular, the apparatus and method may be used to measure acceleration in an earth borehole (i.e., downhole). The apparatus and method compensate for environmental effects and thus may be used in high temperature downhole environments with improved accuracy over the prior art.

Figure 1:
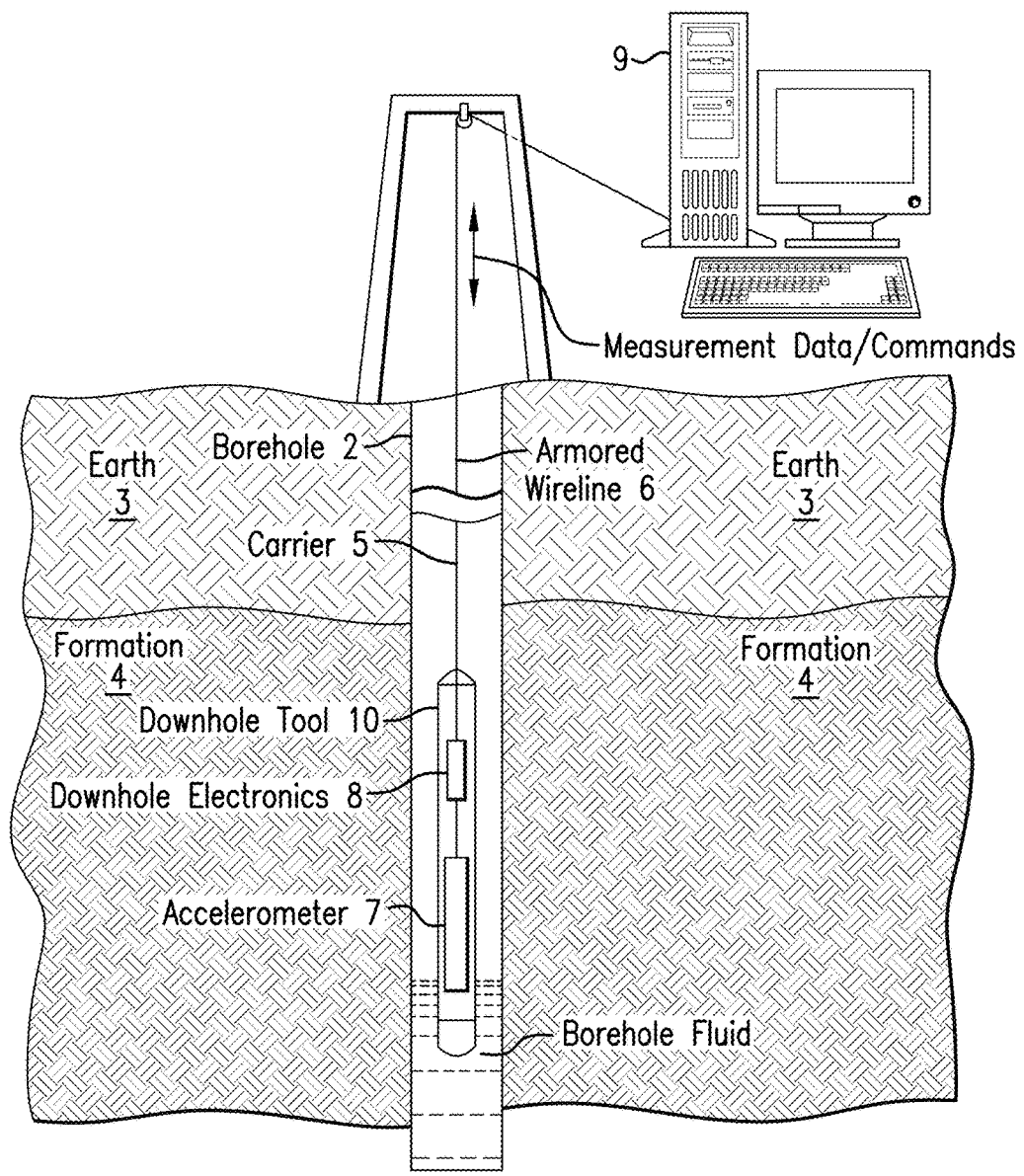
FIG. 1 illustrates a cross-sectional view of an embodiment of a downhole wireline tool disposed in a borehole penetrating the earth.

FIG. 1 illustrates a cross-sectional view of an exemplary embodiment of a downhole tool 10 disposed in a borehole 2 penetrating the earth 3, which may include an earth formation 4. The formation 4 represents any subsurface material of interest that may be sensed by the tool 10. The term "subsurface material" may be used to refer to any material below the surface of the earth 3, such as the formation 4, a formation fluid or solid, and a borehole material, as non-limiting examples. The downhole tool 10 is conveyed through the borehole 2 by a carrier 5. In the embodiment of FIG. 1, the carrier 5 is an armored wireline 6. Besides supporting the downhole tool 10, the wireline 6 can provide communications (i.e., telemetry) between the downhole tool 10 and a computer processing system 9 disposed at the surface of the earth 3. Communications can include sending measurements uphole to the computer processing system 9 or commands downhole to the downhole tool 10. The term "uphole" relates to being closer to the surface via the borehole. In order to operate the downhole tool 10, process measurement data, and/or provide a communications interface with the surface computer processing system 9, the downhole tool 10 includes downhole electronics 8. The operating and processing functions of the disclosure may be performed by the downhole electronics 8, the computer processing system 9, or a combination thereof. In an alternative embodiment referred to as logging-while-drilling (LWD) or measurement-while-drilling (MWD), the carrier 5 can be a drill string or drill tubular. In wireline, LWD, or MWD embodiments, measurement data may be downloaded in real time or after the downhole tool 10 is retrieved from the borehole 2. Non-limiting embodiments of the telemetry for LWD or MWD embodiments include pulsed-mud and wired drill pipe. The downhole tool 10 may be operated continuously through a range of depths or at discrete selected depths in the borehole 2.

In the embodiment of FIG. 1, the downhole tool 10 includes a downhole interferometric accelerometer system 7, which may also be referred to as the accelerometer 7. The accelerometer 7 is configured to measure acceleration to include the force of gravity from which gravitational acceleration can be derived.

Figure 2:
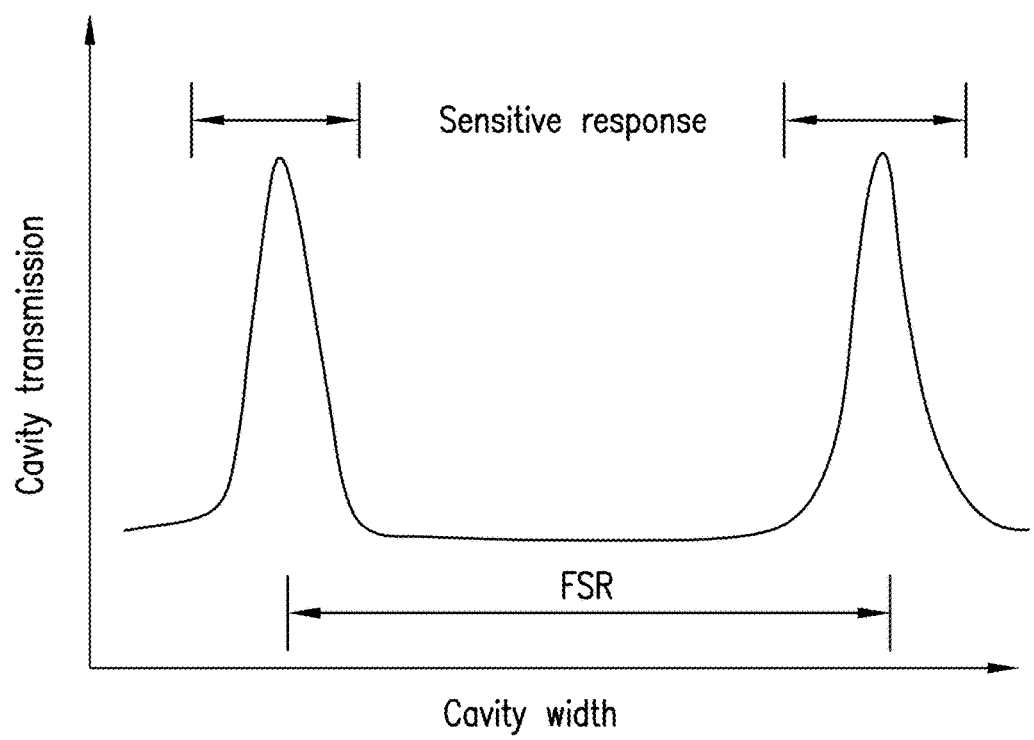
FIG. 2 depicts aspects of transmission of light through a fabry perot etalon.

The underlying purpose of any gravity related measuring device is to precisely measure gravitational acceleration. Changes in acceleration can be measured as a displacement of a spring-mass system. The method chosen to measure small displacements is to construct a Fabry-Perot interferometer where one mirror is fixed and the other mirror is attached to the spring-mass system. In this way the spacing of the mirrors is sensitive to acceleration and both the reflected and transmitted light intensity is a periodic function of the distance between the mirrors. Fabry-Perot interferometers are capable of performing extremely precise measurements of the width of a Fabry-Perot etalon, e.g. "cavity". However, the dynamic range of the measurement is limited to the ratio of the free spectral range (FSR) divided by the cavity finesse as illustrated in FIG. 2. The FSR is the measure of the periodicity of the intensity function, and sensitive response occurs around these peaks. Cavity finesse is the ratio between the FSR and the full-width-at-half-maximum of the resonant peaks.

The transmission of light through the cavity is a function of: the cavity finesse F, the wavelength of light $\lambda$, the pressure dependent refractive index of the cavity $n(p,T)$, the temperature dependent length of the cavity $d(T)$, and the angle of light propagation through the cavity $\theta$, given by $$I(\lambda, d) \approx \frac{1}{1 + F \cdot \sin^2\left(\frac{2\pi}{\lambda} \cdot n(p, T) \cdot d(T) \cdot \cos\theta\right)}. \tag{1a}$$

Equation (1a) can be simplified by combining the index of refraction, incident angle, and wavelength into a single term: the effective wavelength.

$$\lambda_{\it eff} = \frac{\lambda}{n\cos\theta}. \tag{1b}$$

Figure 3:
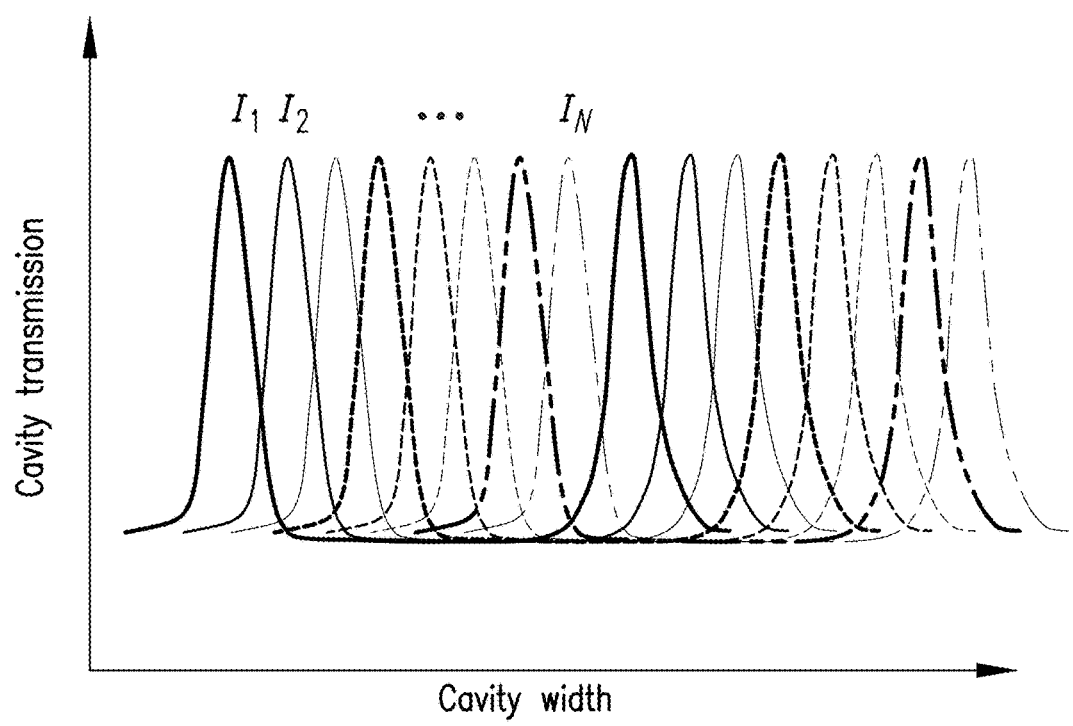
FIG. 3 depicts aspects of a plurality of unique cavity transmission lines for a cavity to provide a sensitive response across the entire free spectral range of the cavity.

The dynamic range can be made continuous through a plurality of these intensity functions, with sufficient uniqueness to cover the entire FSR with sensitive response, see FIG. 3. FIG. 3 depicts aspects of a plurality of unique cavity transmission lines for a cavity to provide a sensitive response across the entire FSR of the cavity. As disclosed herein, the plurality is created by a scanning wavelength source of sufficient $\Delta\lambda$, or altering the refractive index (n) of the cavity with sufficient $\Delta n$, to cover the FSR of the cavity. Unique intensity functions are created by varying the parameters of equation 1. Cavity length is the parameter to be measured—leaving wavelength, refractive index, or propagation angle as variable parameters to create a set of unique intensities profiles that cover the FSR of the cavity.

The apparatus and method disclosed herein reduces of minimizes environmental effects on the measurement of cavity length by varying parameters of the intensity function. The parameters are simultaneously varied in a sense cavity and fixed reference cavity, housed within the same environment. By evaluating the response of these two cavities, environmental effects on the sense cavity can be normalized out (e.g., subtracted), increasing the overall accuracy of the measurement.

Figure 4A:
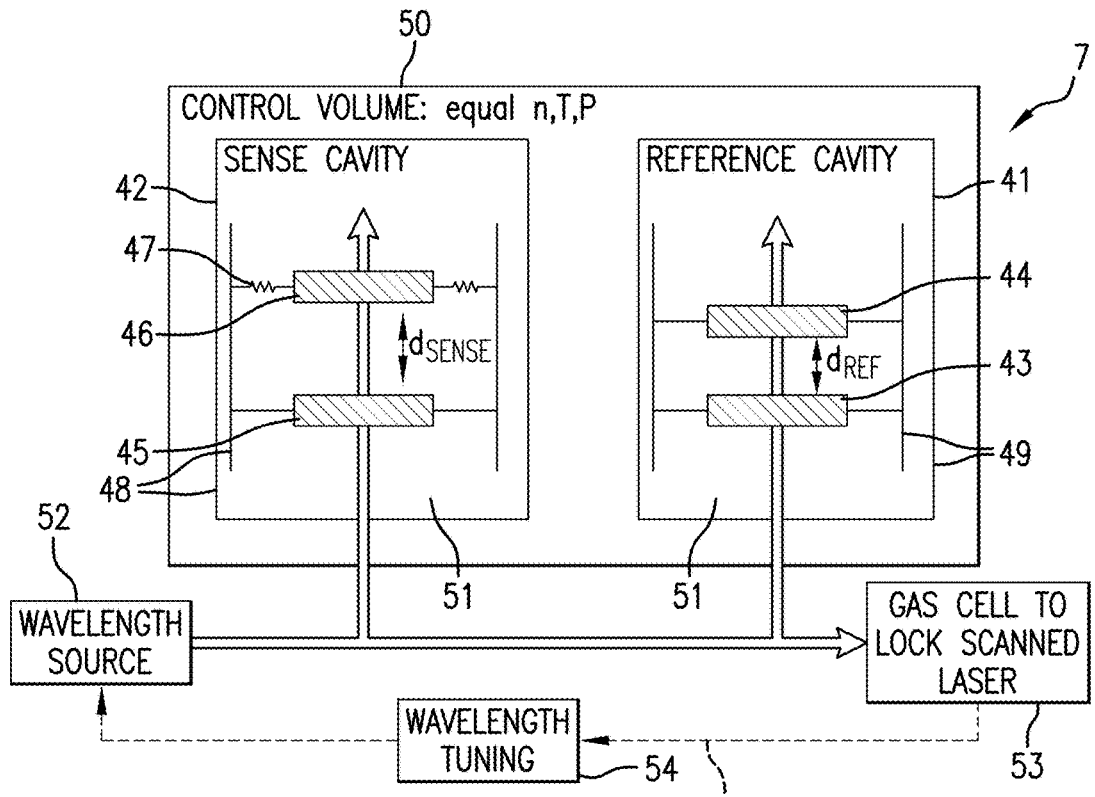
FIGS. 4A and 4B, collectively referred to as FIG. 4, depict aspects of an interferometric accelerometer system having a sense cavity and a reference cavity.

In one or more embodiments of the apparatus and method disclosed herein, a dual cavity approach is taken, as illustrated in FIG. 4. A sensor system 40 includes a fixed reference cavity 41 and a sense cavity 42 where one mirror of the sense cavity is a spring-mass system. Both the fixed reference cavity 41 and the sense cavity 42 are disposed in a control volume 50. The control volume 50 is configured to maintain the same environment simultaneously in the fixed reference cavity 41 and the sense cavity 42. Not shown are components in the control volume 50 such as insulation that may be used to maintain the same environment simultaneously in both cavities. The reference cavity 41 includes a first fixed reflecting surface 43 and a second fixed reflecting surface 44 where the distance between these two reflecting surfaces ($d_{REF}$) is fixed when subjected to an acceleration force. The fixed reflecting surfaces 43 and 44 are configured to be fixed with respect to a reference cavity housing 49. In contrast to the reference cavity 41, the sense cavity 42 includes a fixed reflecting surface 45 and a non-fixed reflecting surface 46. The Fabry-Perot interferometer mirrors require a reflecting material that partially transmits and reflects the incoming radiation. It is essential to keep absorption and light scattering as low as possible. The reflecting coatings usually, depending on the wavelength of light, are multi-layer dielectric systems that are composed of alternating layers of at least two different optical materials. The materials have different indices of refraction. These systems are well understood and enable well-adjusted reflectivity and transmission properties of the mirrors. The reflecting surfaces may be constructed from a low thermal expansion material, such as Zerodur, Corning ULE glass 7972, or fused silica. All materials must have a fully or partially reflecting surface coating at the wavelength of interest. The non-fixed reflecting surface 46 is coupled to a spring device 47 that exhibits spring-like properties including being characterized by a spring constant. The spring device 47 is in turn coupled to a sense cavity housing 48. The non-fixed reflecting surface 46 and the spring device 47 make up a spring-mass system where the non-fixed reflecting surface 46 can be displaced relative to the sense cavity housing 48 and the fixed reflecting surface 45 when subjected to an acceleration force. When subjected to an acceleration force or acceleration, the distance between the fixed reflecting surface 45 and a non-fixed reflecting surface 46 ($d_{SENSE}$) can vary in relation to the magnitude of the acceleration force. Photosensors 56, also referred to as photodetectors 56, detect changes in the intensity of the light beam propagating through the sense and reference cavities, measuring reflected/and or transmitted light proportional to the transfer function of the cavities. Every beam needs to be analyzed in terms of its optical power after it passed through the mirrors. Photosensitive detectors 56, such as photodiodes that are sensitive in the wavelength region of interest, are necessary to analyze the beam.

Figure 4B:
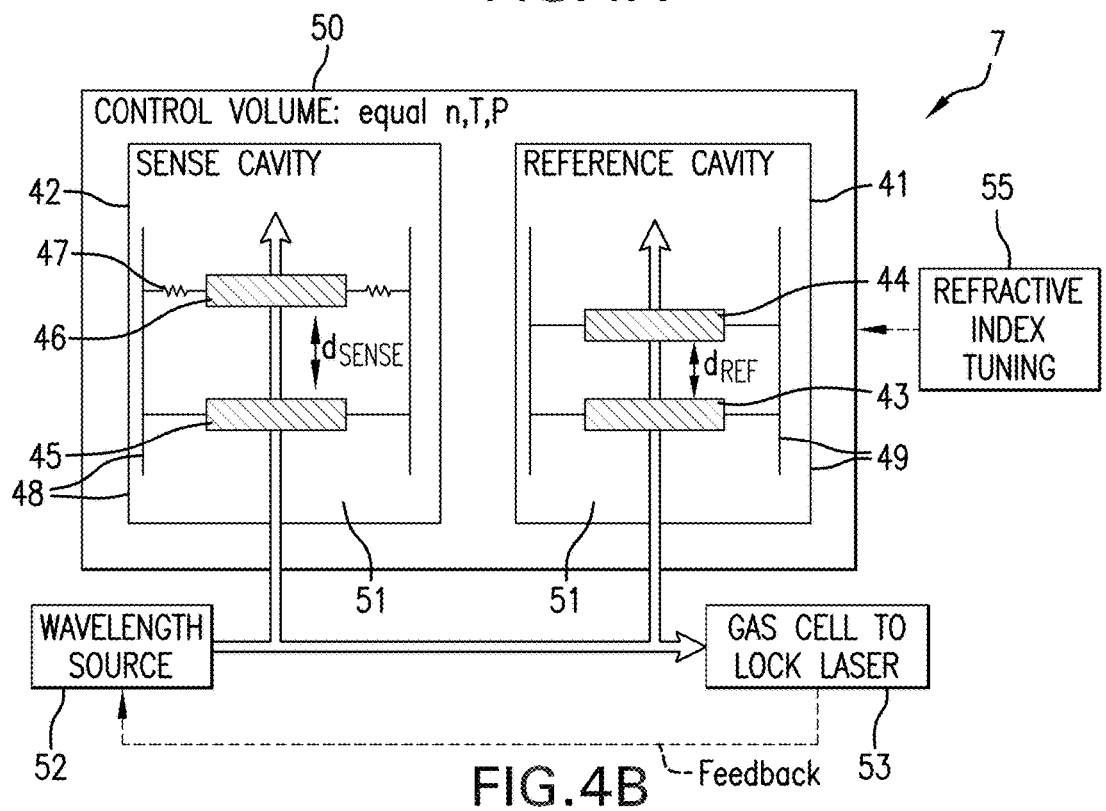
Figure 5B:
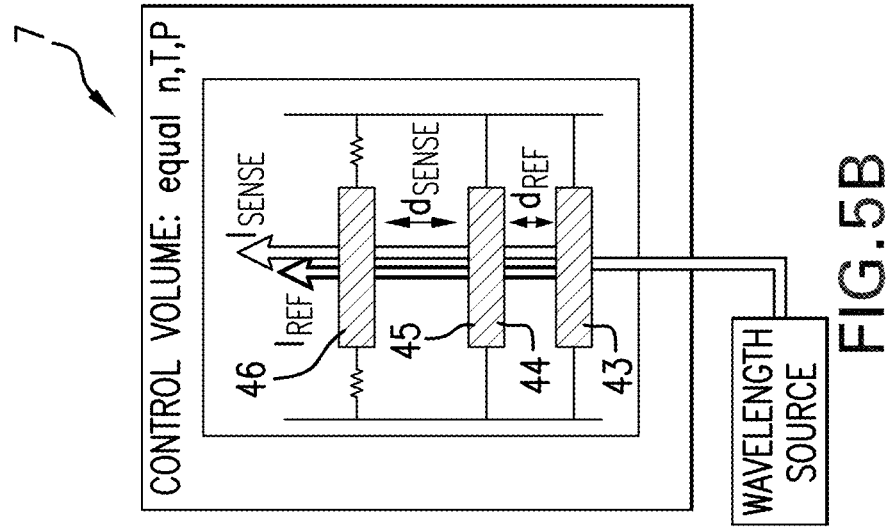
FIGS. 5A and 5B, collectively referred to as FIG. 5, depict aspects of various configurations of the sense and reference cavities in a control volume.
Figure 5A:
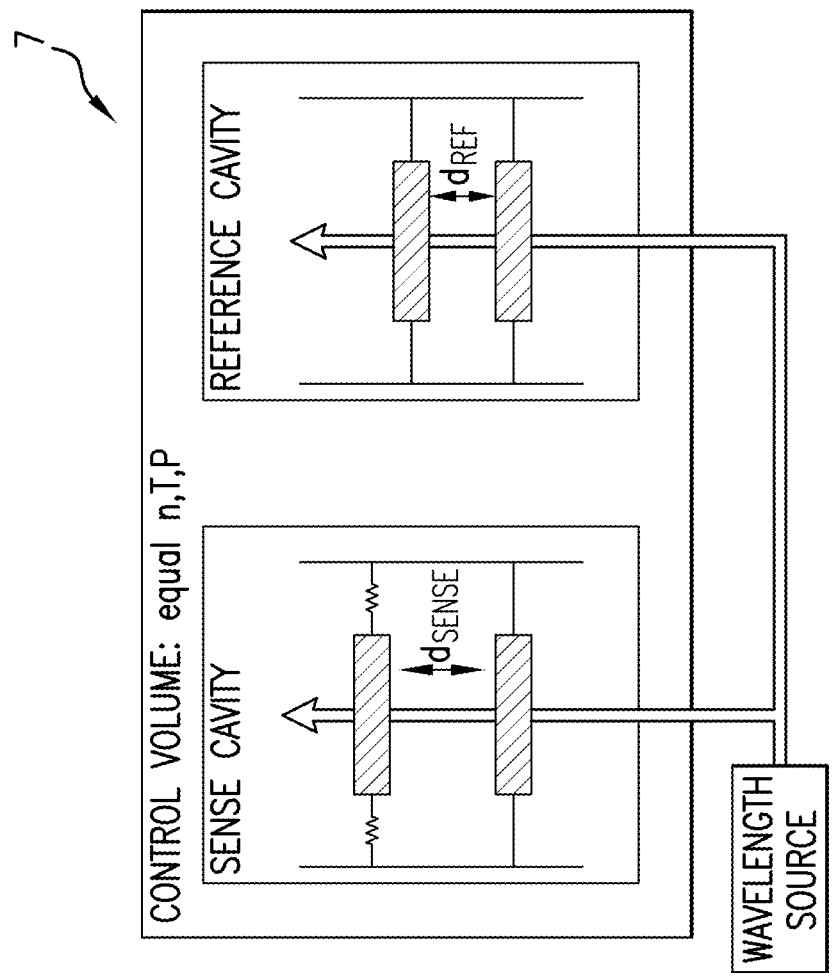

The cavities are housed within the same control volume, with equal temperature, pressure and refractive index of an optical cavity medium 51. The optical medium necessary is a material that transmits the light through the cavity and does not strongly attenuate the light by absorption or scattering. An example for a gas or liquid could be air or certain hydrocarbons. A non-limiting embodiment of the optical cavity medium 51 is an optically transparent mineral oil. The cavities are interrogated simultaneously by a wavelength source 52, where the wavelength source is referenced to a gas cell 53—which acts as a locking mechanism with extremely low susceptibility to environmental effects. The intensity from each cavity is measured simultaneously, while varying the wavelength of the source using a wavelength tuning controller 54 (FIG. 4A) or the refractive index of the control volume using a refractive index controller 55 (FIG. 4B). The length of the sense and reference cavities is then computed from the intensity response. The reference and sense cavities can be integrated into a parallel optical path as illustrated in FIG. 5A or a series optical path as illustrated in FIG. 5B. It can be appreciated that multiple interferometer types may be used in lieu of the Fabry-Perot style interferometer detailed here.

In that acceleration is the second derivative of displacement over time and the force of acceleration is proportional to mass times acceleration, the change in the sense cavity length may be used to calculate acceleration and the acceleration force or gravitational force. In one or more embodiments, the ratio of the cavity lengths is used to estimate the change in the sense cavity length caused by acceleration and other effects to the sensor proof-mass and spring. In one or more embodiments, the sense and reference cavities are manufactured from the same materials and housed within the same control volume, and thus minimizing the effect of the environment on the displacement. This leads to a more accurate output.

To obtain a sensitive response over the complete dynamic range of the sense cavity, the gap between the FSR of a single beam response needs to be populated with a chirped response from a plurality of unique intensity responses—see Equation 1, FIG. 2, and FIG. 3.

In one or more embodiments, the plurality of intensity responses is created by varying the wavelength of the source, or the refractive index of the control volume, in a controlled manner. Methods of varying these parameters follow.

Figure 6A:
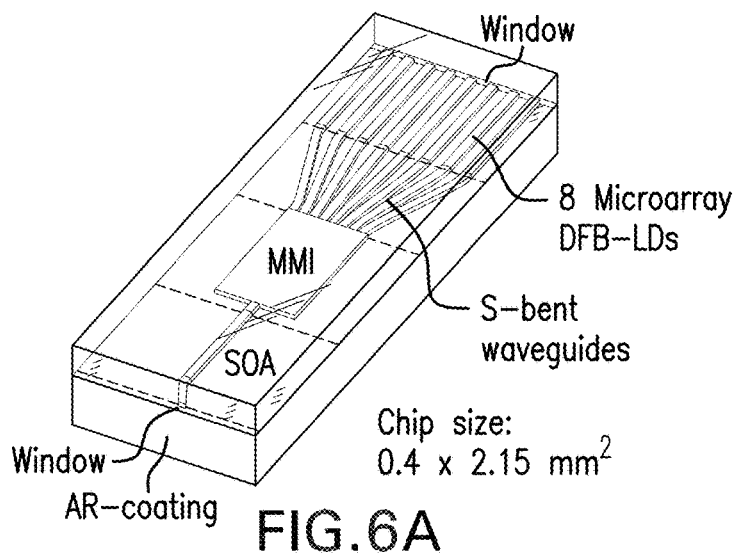
FIGS. 6A and 6B, collectively referred to as FIG. 6, depict aspects of a monolithic multi-wavelength laser and an example of the laser's wavelength as a function of operating temperature and electrical current.

In a first method, independent laser lines selectively turn on and off. In this method, a monolithically integrated multi-wavelength semiconductor laser, such as the one shown in FIG. 6A, having a plurality of S-bent waveguides is used as a variable wavelength source. Output wavelength is selected by modulating individual waveguides, effectively selecting wavelengths on the fly. Each of the outputs of this multi-wavelength laser can be coupled to gas cells or to fixed etalon resonances to control output stability of the entire module.

Figure 6B:
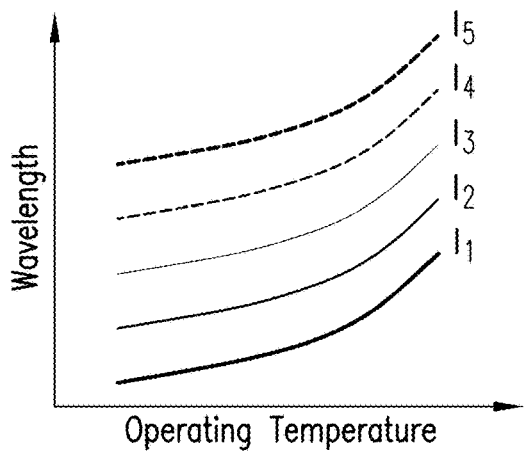

In a second method, a continuum of wavelengths from a single laser source is generated. In this method, the wavelength output of a wide-gain-spectrum laser source is calibrated to changes in driving current and operating temperature. FIG. 6B presents one example of a semiconductor laser's wavelength as a function of operating temperature and electrical current ($I_j$). The wavelength can be varied by adjusting the current through the device, or changing its operating temperature. Benchtop calibrations combined with least squares fitting to the temperature and current control parameters leads to controlled and well known wavelength of the laser light output. The calibration control parameters are then used to estimate the wavelength of light during the measurement process.

In a third method, a continuum of wavelengths Δλ from a single laser source is generated using a relative calibration method and one or more fixed wavelength reference points. During calibration, the laser is locked to a fixed wavelength reference point $\lambda_0$, such as an absorption line in a gas cell, and its operating parameters recorded. The output wavelength is then measured while being tuned by changing the operating temperature and driving current of the laser while keeping the output wavelength fixed. The wavelength output calibration table is constructed by expanding the calibration measurement in terms of a Taylor expansion about the fixed wavelength point, $\lambda_0(I,T)$, where I is the drive current and T is the temperature. The terms in the Taylor expansion are estimated using a least-square fit to the driving parameters. These are shown as partial derivatives in equation (2) below. The gas cell contains at least one substance, which provides sufficient reference absorption lines. Other substances i.e. gases can be added to increase the number of absorption lines over a broad wavelength spectrum During operation of the sensor, the laser is locked to the fixed wavelength point and its driving parameters measured, $I_0(t)$ and $T_0(t)$. The driving parameters may be a slowly changing function of time due to aging or other effects. The laser is then unlocked and the driving parameters are then changed and the light wavelength is estimated from the Taylor expansion.

$$\lambda = \lambda_0 + \left(\frac{\partial \lambda}{\partial I}\right)\bigg|_{\lambda_0} \Delta I + \left(\frac{\partial \lambda}{\partial T}\right)\bigg|_{\lambda_0} \Delta T; \quad (2)$$

$$\Delta I = I - I_0(t); \Delta T = T - T_0(t).$$

Figure 8A:
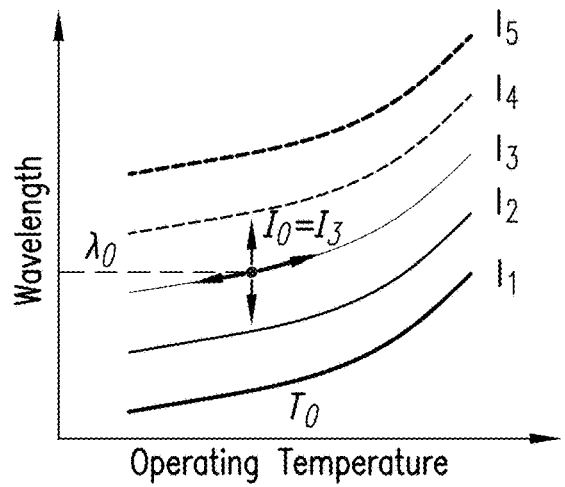
FIGS. 8A-8C, collectively referred to as FIG. 8, depict aspects of a wavelength of a semiconductor laser as a function of operating temperature and electrical current and aspects of calibrating the semiconductor laser.

Here the wavelength is only expanded to first order, but those skilled in the art will appreciate that the expansion could contain higher order terms. The method amounts to accounting for an unknown variable offset term. This method is shown in FIG. 8A.

Figure 8B:
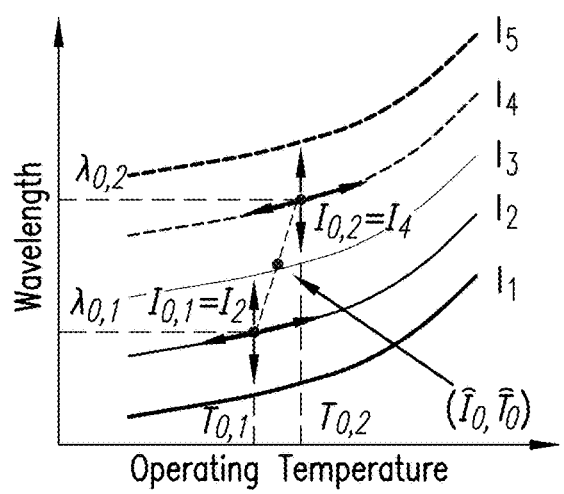

Another embodiment uses two fixed wavelength references, $\lambda_{0,1}$ and $\lambda_{0,2}$. The laser is first locked to a fixed wavelength reference $\lambda_{0,1}$, then tuned via operating temperature and/or driving current to a second fixed wavelength reference, $\lambda_{0,2}$. About both of these points driving parameters are varied, keeping the wavelength fixed. These data points are used to construct calibration table using a Taylor expansion about the center of the data.

$$(\hat{I}_0, \hat{T}_0) = (\langle \hat{I} \rangle, \langle \hat{T} \rangle), \quad (3)$$

where the "hat" represents calibration data and the average is taken over the entire set. During operation of the sensor, the laser is locked to both fixed wavelength points and its driving parameters measured, $(I_{0,1}(t), T_{0,1}(t))$ and $(I_{0,2}(t), T_{0,2}(t))$ similar to the first embodiment described above. These points are used to adjust the point about which Taylor expansion was used keeping the coefficients fixed and the ratios $$\left|\frac{\hat{I}_{2,0} - \hat{I}_{1,0}}{I_{2,0}(t) - I_{1,0}(t)}\right|, \left|\frac{\hat{T}_{2,0} - \hat{T}_{1,0}}{T_{2,0}(t) - T_{1,0}(t)}\right| \quad (4)$$

are used to scale the coefficients of the Taylor expansion. (See FIG. 8B).

Figure 8C:
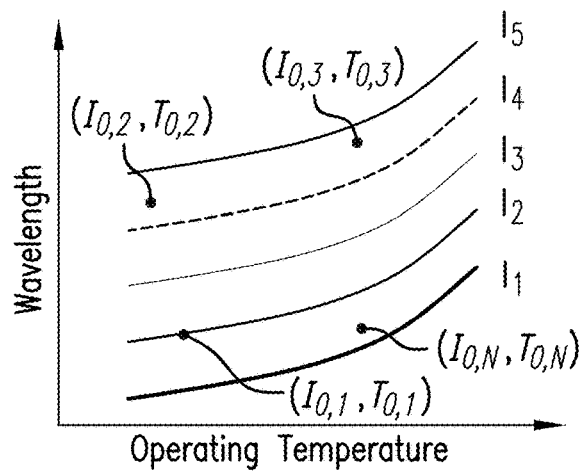

In another embodiment, the laser is locked to three or more fixed wavelength reference points, $\lambda_{0,N}$. During calibration, similar to the first and second embodiment. the tuning parameters are changed keeping the wavelength fixed at each reference point. This improves the accuracy and dynamic range of the fitted Taylor expansion. (See FIG. 8C).

During sensor operation, single measurements at each of the fixed wavelengths are made periodically and the linear terms in the Taylor expansion are calculated "on the fly." The ratio of the linear terms estimated during calibration to the linear terms estimated during sensor operation are used to adjust the higher order terms, if any, in the Taylor expansion.

Figure 7:
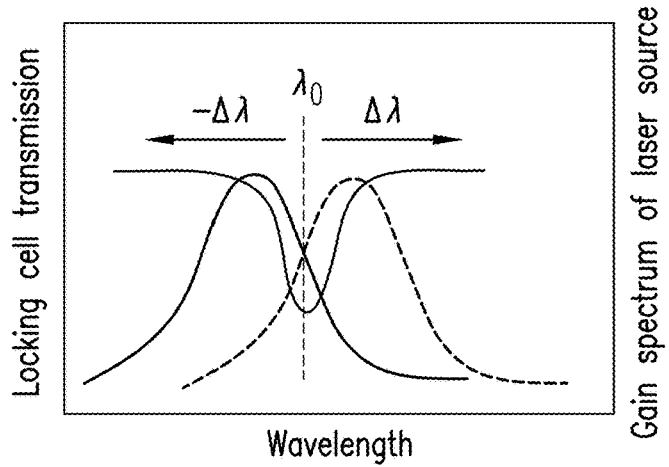
FIG. 7 depicts aspects of a gain spectrum using multiple laser sources compared with a reference line from a gas cell.

In a fourth method, two or more laser sources are used to increase 4X, the dynamic range of the wavelength source. This method of wavelength variation is similar to the second/third method, with the addition of more than one overlapping gain-spectrum laser source. The gain spectra of each laser will overlap across fixed wavelength reference points. This allows, for instance, much sharper linewidth lasers to be used, while still covering a large Δλ. FIG. 7 depicts the gain spectra of multiple laser sources, compared with a fixed wavelength reference $\lambda_0$. The gain spectra of the laser sources overlap across the fixed wavelength reference. This configuration allows for feedback/tunability of both laser sources from the same fixed wavelength reference, with a larger aggregate wavelength tunability range than a single laser source.

Next, methods of varying the refractive index of a cavity optical medium in the control volume are discussed. In a first method, the refractive index of the cavity optical medium in the control volume is altered by varying the pressure of the control volume. In one or more embodiments, initial pressure is set pneumatically, with sweeping controlled by varying piston length of a piston in a chamber or a controlled pressure change from a fixed orifice. In a second method, which is similar to the first method, the refractive index is varied instead by imposing an electric field across the cavity optical medium, i.e. the Pockels or Kerr effect. Favorable materials can be chosen such that an appreciable change in refractive index is achieved by varying the imposed electric field.

Next, processing measurement data obtained from the interferometric accelerometer is discussed. The goal of the measurement is to compute $d_S$, the environmental-effect-normalized length of the sense cavity, as a function of acceleration (g). The sense cavity response is affected by environmental conditions, particularly by temperature and its impact on the thermal expansion of the volume that surrounds the cavity. Data is simultaneously sampled from the sense and reference cavities, while varying the wavelength of the source and/or the refractive index of the control volume. The processing of the measurement data is the same for sweeping the wavelength λ, and/or for sweeping the index of refraction n.

Methods using an intensity inversion approach are now discussed. In a first method, sets of signal responses $S_R = (S_{R1}, \ldots, S_{RJ})^T$, $S_S = (S_{S1}, \ldots, S_{SJ})^T$, and for the reference and sense cavities, plus $S_M = (S_{M1}, \ldots, S_{MJ})^T$ for the photodetector (e.g., diode) that monitors the signal intensity of the input laser beam, are acquired while varying the input wavelength of light over a series of wavelengths, $\lambda_{eff} = (\lambda_{eff,1}, \ldots, \lambda_{eff,J})^T$, impinging upon the reference and sense cavities. Here the signals are represented as column vectors. Additionally, the vectors are ordered so that $\lambda_{eff,j} < \lambda_{eff,j+1}$ for all j. This ordering of the elements of $\lambda_{eff}$ from small to large and will simplify the analysis described later below.

The variable wavelength source has some intensity, $I_0$ ($\lambda_{eff}$), that may be a function of the wavelength, with a fraction of light propagating to the reference cavity, $f_R I_0$, the sense cavity, $f_S I_0$, and a monitor diode, $f_M I_0$, such that $f_R + f_S + f_M = 1$. The intensity may also be time dependent. For example, locking laser diodes to an absorption line requires modulation of the current which simultaneously modulates both the wavelength and intensity. In addition, laser diodes also have a noise source commonly called relative intensity noise or RIN. As its name implies, it produces intensity variations in the laser light output. The signals are simultaneously or sequentially in a rapid manner (meaning rapid compared to response of cavities to external stimuli) acquired through photodetectors/photodiodes/electronics, with the following transfer functions:

$$S_{Rj}(\lambda_{eff,j}, d_R) = \frac{f_R \cdot G_R \cdot I_0(\lambda_{eff,j})}{1 + F_R \sin^2\left(\frac{2\pi}{\lambda_{eff,j}} d_R(T)\right)} \quad (5)$$

$$S_{Sj}(\lambda_{eff,j}, d_S) = \frac{f_S \cdot G_S \cdot I_0(\lambda_{eff,1})}{1 + F_S \sin^2\left(\frac{2\pi}{\lambda_{eff,1}} d_S(T)\right)} \quad (6)$$

where $G_i$ is the electronic gain of the signal chain for the respective signals, $F_R$ and $F_S$ are the finesse factors for the reference and sense cavities. The above equations implicitly assume that the difference of effective wavelengths is caused either by a change in the input laser wavelength or changes in the index of refraction. Changes in the angle of incidence require different electronic gains and different finesse factors for each effective wavelength. This kind of sensor has been disclosed elsewhere. It is also assumed that the effective wavelengths are equal between the reference, sense, and monitor channels. This does not need to be the case however. It is sufficient that there is a one-to-one correspondence between the effective wavelengths between the sensor, reference and monitor channels. For example, the light might enter the sense cavity with a slightly different angle than the reference cavity and hence the effective wavelengths would all be slightly different. However, because the angles are fixed, the one-to-one correspondence is maintained. Without loss of generality, those skilled in the art know that the effective wavelength can also be tuned by changing the angle of propagation through the cavity, the index of refraction, or the wavelength. If the reference and sense cavities are housed in the same control volume, then their ambient temperatures, pressures, and refractive indices would be equal, i.e. $n_R(P) = n_S(P) = n(P)$. All the dependencies of the parameters in the following equations are treated as implicit.

Normalizing (1) and (2) by the monitor signal response (3) yields, for any wavelength in the set at index j, $$S'_{R,j}(\lambda_{eff,j}, d_R) = \quad (7)$$

$$\frac{S_R(\lambda_{eff,j}, d_R)}{S_M(\lambda_{eff,j})} = \frac{\frac{f_R \cdot G_R \cdot I_0(\lambda_{eff,j})}{f_M \cdot G_M \cdot I_0(\lambda_{eff,j})}}{1 + F_R \sin^2\left(\frac{2\pi}{\lambda_{eff,j}} d_R\right)} = \frac{A_R}{1 + F_R \sin^2\left(\frac{2\pi}{\lambda_{eff,j}} d_R\right)}$$

Similarly for the sense channel data, $$S'_S(\lambda_{eff,j}, d_S) = \quad (8)$$

$$\frac{S_S(\lambda_{eff,j}, d_S)}{S_M(\lambda_{eff,j})} = \frac{\frac{f_S \cdot G_S \cdot I_0(\lambda_{eff,j})}{f_M \cdot G_M \cdot I_0(\lambda_{eff,j})}}{1 + F_S \sin^2\left(\frac{2\pi}{\lambda_{eff,j}} d_S\right)} = \frac{A_S}{1 + F_S \sin^2\left(\frac{2\pi}{\lambda_{eff,j}} d_S\right)}$$

The proportionality constants $A_R$ and $A_S$ depend on hardware settings, and as such can be found through calibration techniques. For example, the maximum of the normalized signal response from the reference cavity yields $$\max(S'_{k,j}(\lambda_{eff,j}, d_k)) = \frac{A_k}{1 + F_k \sin^2(0)} = A_k, \quad (9)$$

where $k \in \{R, S\}$. The finesse factor of the reference cavity can then be found using this calibrated proportionality constant and the minimum of the normalized signal response $$\min(S'_{k,j}(\lambda_{eff,j}, d_k)) = \frac{A_k}{1 + F_k \sin^2(\pi/2)} = \frac{A_k}{1 + F_k}. \quad (10)$$

It is also clear that $A_k$ and $F_k$ are constants that are independent of the effective wavelength. Because the sets of signals $S'_{k,j}$ are noisy, $A_k$ and $F_k$ may be estimated in a least-square sense.

Figure 9:
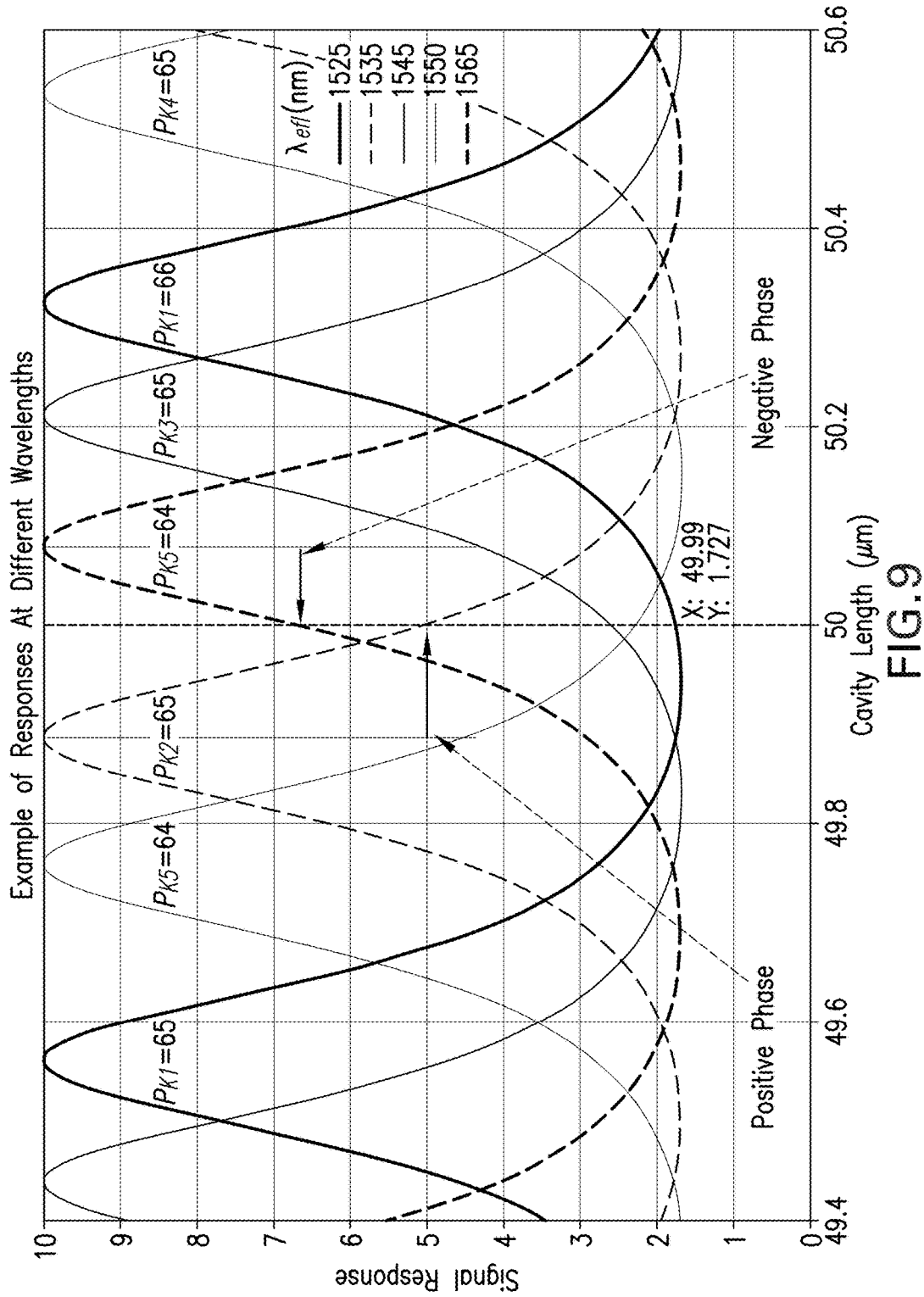
FIG. 9 depicts aspects of an optical response of a cavity to different effective wavelengths.

An example of the optical response of a cavity to different effective wavelengths is shown in FIG. 9. In this example, the finesse factor, F, is 5 and the gain factor, A, is 10 and we observe the optical responses near a cavity length near 50 um. The maximum and minimum values of the responses are 10 and 1.67 respectively. One can observe that the peak responses are not evenly spaced in cavity length. This is because the wavelengths are incommensurate. The effective wavelengths and corresponding signals are used in the example are shown in columns 1 and 2 of Table 1 for a cavity length of 50 um. The example data in Table 1 relates to the responses shown in FIG. 9.

TABLE 1

| $\lambda_{eff}$ (um) | S' | phase ($\phi$) | p | q |
|---|---|---|---|---|
| 1.525 | 1.743 | 1.339 | 66 | 1 |
| 1.535 | 5.032 | 0.460 | 65 | 0 |
| 1.545 | 2.569 | 0.864 | 65 | 1 |
| 1.555 | 2.272 | 0.970 | 64 | 0 |
| 1.565 | 6.674 | 0.321 | 64 | 1 |

The optical phase can be estimated from the signal, the proportionality constants, and the finesse factor:

$$\phi_{R,j} = \sin^{-1}\left(\sqrt{\left(\frac{A_R}{S'_{R,j}} - 1\right) \cdot \frac{1}{F_R}}\right) \quad (11)$$

$$\phi_{S,j} = \sin^{-1}\left(\sqrt{\left(\frac{A_S}{S'_{S,j}} - 1\right) \cdot \frac{1}{F_S}}\right) \quad (12)$$

The normalized signals from the reference and sense cavities can then be solved for estimates of the cavity length, $\tilde{d}$:

$$\tilde{d}_{R,j} = \frac{\lambda_{eff,j}}{2}[p_{R,j}\pi + (-1)^{q_{R,j}}\phi_{R,j}]$$

$$\tilde{d}_{S,j} = \frac{\lambda_{eff,j}}{2\pi}[p_{S,j}\pi + (-1)^{q_{S,j}}\phi_{S,j}] \quad (13)$$

where $p_{R,j}$ and $p_{S,j}$ are the integer orders of the periodic transfer functions for the reference and sense cavities at the source wavelength index j. The constants, $q_{R,j}$ and $q_{S,j}$ are either 0 or 1 and determine the sign of the optical phase of the cavity. Thus each sense and reference channel yields an estimate of size of the sense cavity and the reference cavity respectively. Thus equation 6 is solved for the values of $p_{k,j}$ and $q_{k,j}$ for all j self-consistently. One method of making the measurements self-consistent is to minimize the variance of the elements of $\tilde{d}_k$, with respect to $p_k$ and $q_k$, $$\text{Var}(\tilde{d}_k) = \langle \tilde{d}_k^2 \rangle - \langle \tilde{d}_k \rangle \langle \tilde{d}_k \rangle \quad (14)$$

subject to the constraint, $$p_{k,1} \geq p_{k,2} \geq \ldots p_{k,J-1} \geq p_{k,J}. \quad (15)$$

Moreover, the variance should be calculated using an appropriate weighting function because the accuracy varies greatly over its range of $\pm\pi$. One such weighting factor could be $1/\sigma_{\phi_{k,j}}^2$, where $\sigma_{\phi_{k,j}}$ is the error in the channel phase estimate as estimated from the error in $S_k'$.

This constraint arises from the fact that the periodicity of the response functions, $S_{k,j}'$, are $\lambda_{eff,j}/2$. Thus, for a given cavity length, there are more periods in the response functions for smaller wavelengths and because we have ordered the elements of $\lambda_{eff}$ from small to large, we arrive at the above constraint. Additionally, because the percent deviation of $\lambda_{eff,j}$ from its average value, we expect the range for $p_{k,j}$ to be small as well.

$$P + \Delta P \geq p_{k,j} \geq P \forall j;$$

$$0 \leq \Delta P \leq 3. \quad (16)$$

Returning to the example in FIG. 9 and Table 1, the optical phase can be computed from the signals and the values of $A_k$ and $F_k$, using equations (11) and Table 1. When the cavity length is computed by minimizing $\text{Var}(\tilde{d}_k)$, the values of $p_k$ and $q_k$ are found and shown in the table. The subsequent estimate of $\langle \tilde{d}_k \rangle$ is unique because the signals are incommensurate. One can observe that $p_k$ satisfies equation (15) and that $\Delta P=2$ satisfying equation (16).

Additionally, if a cavity's size is changing due to fluctuations in the property to be measured, then the "relative" sign of the phase can be determined by plotting $S_k'(\lambda_{eff,j}, d_k)$ vs. $S_k'(\lambda_{eff,i}, d_k)$. If the slope is positive, $(-1)^{q_{k,j}} = (-1)^{q_{k,i}}$. If the slope is negative, then $(-1)^{q_{k,j}} = -(-1)^{q_{k,i}}$. An example of this property is shown in FIG. 10. Here each of the signals is plotted versus the signal for the second effective wavelength. Here the slope is negative for effective wavelengths 1, 3, and 5, but positive for wavelength 4. Thus, $q_k = \{0,1,0,1,0\}$ or $q_k = \{1,0,1,0,1\}$. In the present example, the proper choice is the latter rather than the former. This is the case presented in the specific examples summarized in the rightmost column in TABLE 1 labeled q. In the case of a gravimeter, the cavity size is sensitive to ambient seismic vibrations and it is these vibrations that provide for the estimate of the "relative" sign of the channel phases.

$\text{Var}(\tilde{d}_k)$ is non-linear in $p_k$ and $q_k$, and therefore linear least-square methods such as singular value decomposition will not work in the interpretation of the data because of the non-linear nature of this interferometer's raw data. For the sense cavity, the elements of $q_k$ are essentially random values and linearizing the minimization problem would be inefficient. Non-limiting examples of methods that may be used to handle the interferometer's strongly non-linear raw data interpretation problem include global optimization interpretation methods such as include simulated annealing, genetic algorithms, and neural networks. Other methods may also be used. The forward model describing the interferometer instrumentation behavior with unknown functional parameters needs to be determined in a known calibration environment. Once the forward model's parameters have been calibrated, the interferometer instrumentation gravimeter is ready to perform measurements in an unknown environment. Due to the interferometer instrumentation behavior, non-linearity global optimization techniques are required to resolve interferometer's calibration parameters for non-linear raw data acquired in a known calibration environment identifying the global minimum for each parameter solved. Once the instrumentation forward model has been determined with a calibrated parametrization as discussed above, one or more global optimization techniques can be used to interpret the interferometer's non-linear raw data measurements performed in an unknown field environment targeted to be surveyed. Alternatively, the global optimization can be replaced by a two-step hybrid optimization solution. An initial global optimization step identifies the local region where the global minimum is located and in a second optimization step the local minimum solution can be located by a standard optimization technique such as the Levenberg-Marquardt algorithm (LMA), also known as the damped least-squares (DLS) method, applied to identify the local minimum within this local region. The LMA can find the local minimum solution within the local region identified by the global optimization as containing the global minimum sought after.

For the reference cavity, we do not expect size changes larger than any element in $\lambda_{eff}/2$. Thus, after an initial solution is found using calibration data, only a few of the elements in $p_R$ and $q_R$ may change and this initial solution can be used as the starting point of real-time estimates using one of the solution algorithms.

Self-consistent estimates of $\langle \tilde{d}_S \rangle$ and $\langle \tilde{d}_R \rangle$ have now been solved for as the best estimates of the cavity lengths. The use of these estimates in minimizing the effects of temperature fluctuations as well as other environmental factors is now discussed. For simplicity, self-consistent estimates are represented by $$\tilde{d}_S = \langle \tilde{d}_S \rangle; \tilde{d}_R = \langle \tilde{d}_R \rangle. \quad (17)$$

In the following example, a particular implementation of the sensor as a gravimeter or accelerometer is discussed. However, methods described below can be applied to measurement of any particular property as long as the effect of the property is transduced to a change in cavity length.

The temperature dependent cavity distance terms are dependent upon the coefficient of thermal expansion (CTE) of the materials used to construct the cavities:

$$d_R(T) = d_{0R}(1 + CTE_R \cdot \Delta T) \quad (18)$$

$$d_S(T) = d_{0S}(1 + CTE_S \cdot \Delta T) + \frac{g}{\omega_0^2}(1 + CTE_S' \cdot \Delta T) \quad (19)$$

where $\omega_0^2$ is the resonant angular frequency of the spring-mass system in the sense cavity; $CTE_S'$ is the temperature dependence of the sensing spring including temperature dependence of Young's modulus; and g is acceleration. The subscript 0 on $d_{OR}$ and $d_{OS}$ represents the length of the cavities at some known temperature and $\Delta T$ is the relative change in temperature from that temperature. At some temperature, the ratio between these two distances is:

$$\frac{d_S(T)}{d_R(T)} = \frac{d_{0S}(1 + CTE_S \cdot \Delta T) + \frac{g}{\omega_0^2}(1 + CTE_S' \cdot \Delta T)}{d_{0R}(1 + CTE_R \cdot \Delta T)} \quad (20)$$

From equation (20), it can be seen that matching the CTE of elements minimizes the temperature dependency of the measurement. If $CTE_R = CTE_S$, the temperature dependencies of the cavities are eliminated. If $CTE_R = CTE_S'$, the temperature dependency of the accelerometer response is eliminated. If $CTE_R = CTE_S = CTE_S'$, the temperature dependency of the entire system is eliminated. If precise matching is not possible, a combination of matching techniques may be used to minimize the total system temperature dependence. If the only the sense and reference cavities coefficients of thermal expansion are matched:

$$\frac{d_S(T)}{d_R(T)} = \frac{d_{0S}}{d_{0R}} + \frac{\frac{g}{\omega_0^2}(1 + CTE_S' \cdot \Delta T)}{d_{0R}(1 + CTE_R \cdot \Delta T)} \quad (21)$$

Taking the binomial approximation, assuming $\Delta T^2$ terms are small, and simplifying:

$$\frac{d_S(T)}{d_R(T)} \approx \frac{d_{0S}}{d_{0R}} + \frac{g}{\omega_0^2 \cdot d_{0R}}(1 + (CTE_S' - CTE_R) \cdot \Delta T). \quad (22)$$

In this instance the thermal effects on the transducer have been reduced. As a practical matter, eqn. (22) can be rewritten.

$$\frac{\tilde{d}_S}{\tilde{d}_R} \approx \alpha + \beta \tilde{g}, \quad (23)$$

where $\alpha$ and $\beta$ are constants determined by calibration. Here estimates of cavity lengths and gravity have been substituted for the actual values. The calibration proceeds by making estimates of cavity lengths while varying g. The constants $\alpha$ and $\beta$ are estimated through a least square method. The temperature of the cavities can also be varied and estimate $\alpha$ and $\beta$ as functions of environmental parameters such as T. These processes are similar to the processes described above concerning the processing of measurement data.

A particular method for processing the data acquired by the apparatus disclosed herein has been described. It involved first estimating the cavity lengths of the reference cavity and the sense cavity separately. Another method is now described. Define $$\tilde{\xi}_j \equiv \frac{\tilde{d}_{S,j}}{\tilde{d}_{R,j}} = \frac{[p_{S,j}\pi + (-1)^{q_{S,j}}\phi_{S,j}]}{[p_{R,j}\pi + (-1)^{q_{R,j}}\phi_{R,j}]}; \quad (24)$$

-continued $$\tilde{\xi} \equiv (\tilde{\xi}_1, \tilde{\xi}_2, \ldots, \tilde{\xi}_J).$$

Instead of minimizing $Var(\tilde{d}_R)$ with respect to $p_R$ and $q_R$, and $Var(\tilde{d}_S)$ with respect to $p_S$ and $q_S$ separately, $Var(\tilde{\xi})$ is minimized with respect to $p_R$, $q_R$, $p_S$, and $q_S$ simultaneously. The rules in equations (15) and (16) still apply as well as the using the relative phase measurements described above referring to the "relative" sign of the phase. The result is the best estimate of the ratio of sensor to reference cavity lengths, $$\xi = \langle \tilde{\xi} \rangle. \quad (25)$$

The analysis of temperature dependence of a specific sensor example described above referring to equations (21) and (22) still applies and can be substituted for $d_S/d_R$ in equation (23). The calibration constants remain calibration constants. The advantage of using this method is that the need for knowing a priori any of the effective wavelengths has been completely eliminated. Furthermore, this analysis method eliminates the need to control the pressure of the fluid inside the cavities in order to minimize fluctuations of the effective wavelengths because of changes to the index of refraction.

This suggests modifications to the apparatus shown in FIGS. 4 and 5. First, the controlled environment of the sensor and reference cavity does not need to be hermetically sealed unless the cavity contains a fluid different from air. The temperature of the controlled environment still needs to be accurately maintained for the example of the gravimeter because of the thermal dependence of the spring element within the apparatus. Second the need for a gas cell, 53, in FIG. 4 is eliminated. Only a source of wavelength tuning, 54, is required.

The requirements for the wavelength source, 52, are that it should have sufficiently small linewidth compared to the finesse of the cavities; that it be tunable over a sufficiently large range of wavelengths; and that its average optical frequency be sufficiently stable so that any signal averaging done by the acquisition electronics is small compared with both cavities free spectral range. Tunable external cavity laser diodes in Littrow or Littman configurations may be used as well as tunable fiber lasers.

A further requirement is that the signals from the reference cavity and the sense cavity are acquired simultaneously. This limits the speed with which the effective wavelength can be changed in addition to placing the condition on wavelength stability described above. Because of these conditions, it may be advantageous to change the effective wavelength in a stepwise fashion, although this may be unnecessary depending on the configuration and topology of the acquisition electronics.

In a second method, cavity distances can be computed directly from the free spectral range (FSR) of the sense and reference cavities. First, define the effective frequency as $$f_{eff} = f(n \cos \theta). \quad (26)$$

This is the effective light frequency inside the cavity. Please note that the effective frequency and effective wavelength still satisfy $$f_{eff} \lambda_{eff} = c. \quad (27)$$

Using this definition, the free spectral range is $$\Delta f_{FSR,k} = \frac{c}{2n_k d_k \cos \theta_k}; k \in \{S, R\}, \quad (28)$$

where c is the speed of light in vacuum, $n_k$ is the refractive index of the sense cavity, $d_k$ is the distance of the cavity. The effective free spectral range can be defined by analogy to equation (26) and the effective free spectral range is $$\Delta f_{FSR,eff,k} = \frac{c}{2d_k}; k \in \{S, R\}. \quad (29)$$

In this method, the cavity is interrogated with a swept wavelength (or refractive index) with sufficient range to cover at least two resonant peaks. The FSR is then calculated as the difference in swept parameter space between peaks, see FIG. 2. In this figure, the horizontal axis, cavity width, is replaced by the light frequency or wavelength. Peaks occur at $\lambda_{eff,j}$ and $A_{eff,j'}$, indicated by the local maxima of the response curve, $S_{MAX}$. (See also FIG. 9, where the "Scan wavelength" corresponds to the effective wavelength.) The effective FSR is then computed from the difference in the frequencies corresponding to $\lambda_{eff,j}$ and $\lambda_{eff,j'}$. The cavity distance is directly calculated using equation (29). Temperature effects on the calculated cavity distance are removed using similar sense/reference normalization techniques as described in earlier methods above.

Figure 11:
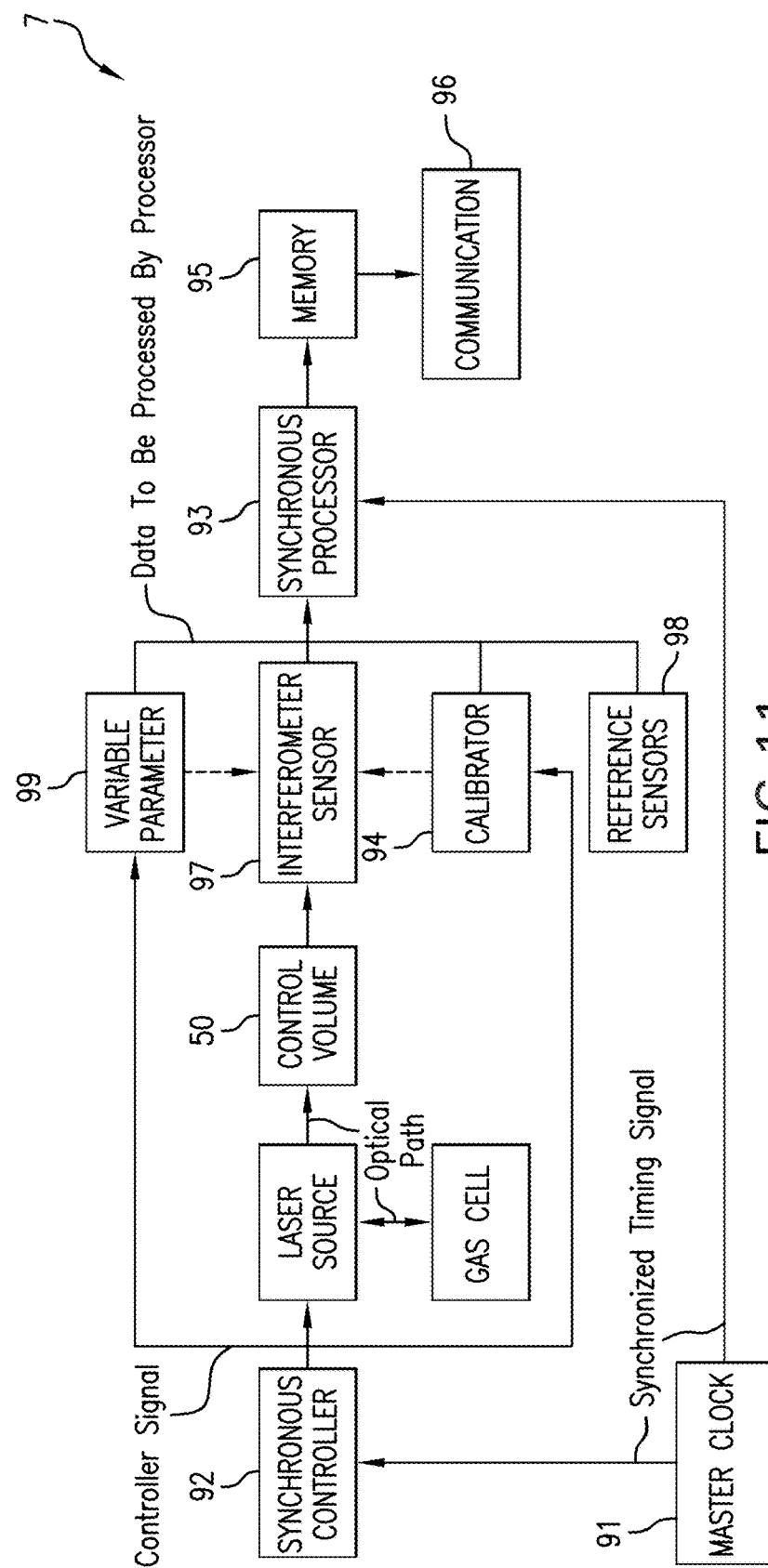
FIG. 11 is a block diagram depicting aspects of operations of an interferometric accelerometer system.

In a third method, an embodiment of the interferometric accelerometer system 7 illustrated in FIG. 11 includes the laser and sensor system detailed above and shown in FIGS. 4 and 5, as well as: a master clock 91, a synchronous controller 92, a synchronous processor 93, an optional calibrator 94, memory 95, and a communication device 96. The accelerometer system 7 further includes a variable parameter controller 99 configured for varying the wavelength of the light emitted by the laser and/or the index of refraction of the optical medium.

The synchronous controller 92 drives the laser source, operates the calibrator 94, and controls the variable parameter sweep. Control timing is sourced by the master clock 91, and synchronized with the processor 93.

The optional calibrator 94 is configured to impart a known acceleration upon the interferometer sensor. This is used as a fixed set of data points for a known input, to accurately calibrate the sensor response.

The synchronous processor 93 acquires data from the interferometric sensor, the variable parameter to be changed, calibrator status, and environment sensors. Environment sensors include: temperature, pressure, acceleration/inclination, and a real time clock. Acquisition timing is sourced by the master clock 91, and synchronized with the controller 92. Processing can be done downhole using the downhole electronics 8 or on the surface using the surface computer processing system 9. Processed data is stored to memory 95. Communication device 96 is configured to send the stored data to the surface. Environment sensors 98 may be used to measure cavity parameters such as pressure and temperature. In some instances, data from the environment sensors are used to identify correlations of the sensor response with the parameters the environment sensors measure. If a correlation is identified, then the sensor response is modified to remove the assumed dependence on the measured parameter. For example, the sense and reference cavities are in a hermitically controlled environment to reduce the temperature dependence of the measured signals. However, some residual temperature dependence may remain. If the remaining temperature dependence is larger than can be tolerated, it can be further reduced by common computational methods because the cavity temperature has been measured by one of the environment sensors.

Data from the interferometric accelerometer 7 is acquired using an interferometer sensor 97 with an initial calibration to a known stimulus, with raw data acquisition following immediately. A control parameter is varied continuously, as detailed above, during the data acquisition process. Raw data is simultaneously acquired from the reference cavity, the sense cavity, any environment sensors, and the controlled parameter sweep.

Figure 12:
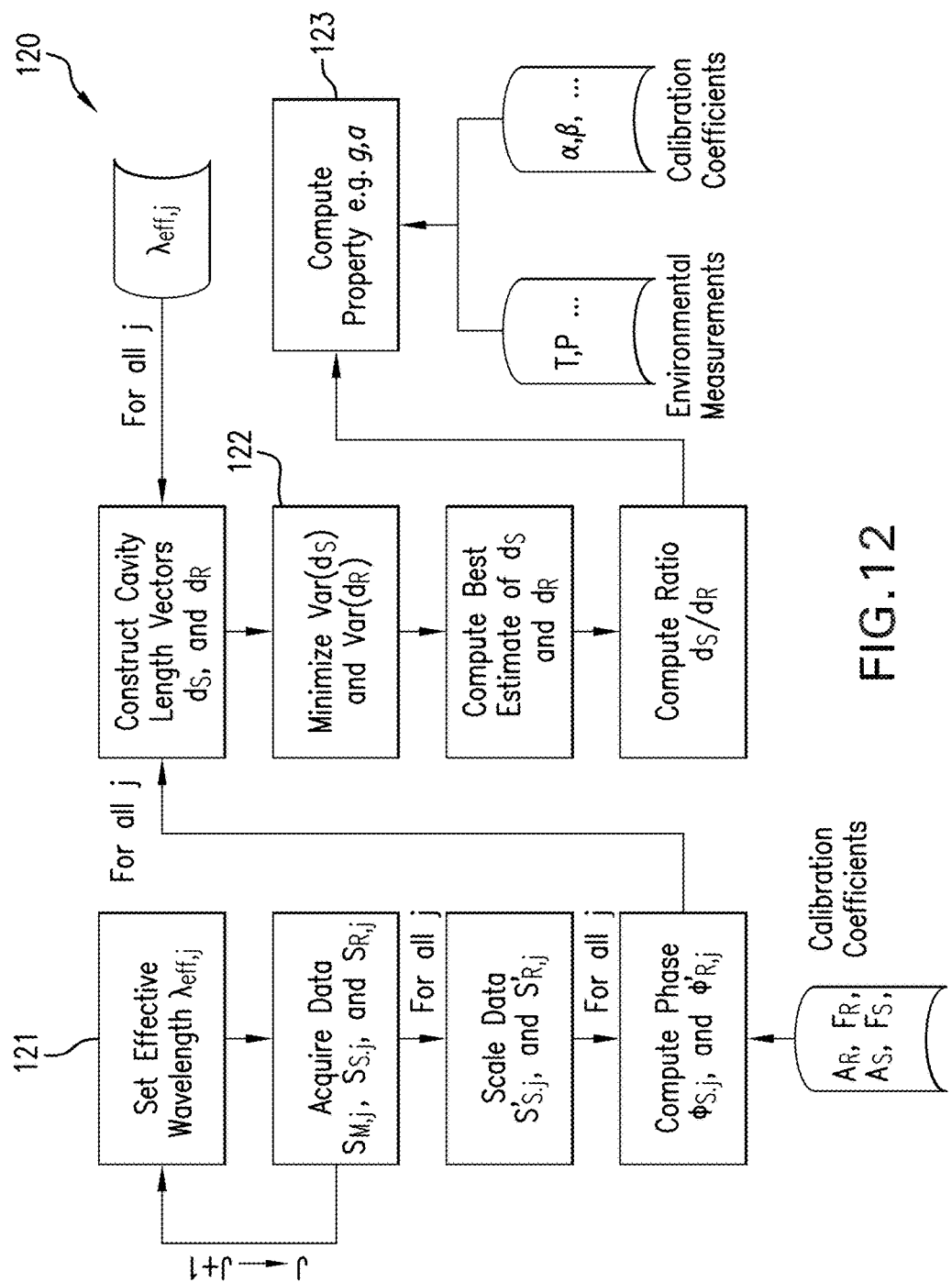
FIG. 12 is a flow diagram for acquiring and processing data for the interferometric accelerometer.

FIG. 12 is a block diagram for one embodiment of a data acquisition and processing sequence 120. In FIG. 12, block 121 represents the start of the sequence, block 123 represents the end of the sequence, and block 122 represents using nonlinear algorithms such as simulated annealing to minimize the variation of the reference ad sense cavity length estimates. After carrying out the acquisition sequence, where the sensor is calibrated and then acquires data for a period of time, processing takes place. Data acquired during calibration is inverted to acquire fit coefficients to the variable parameter sweep. These fit coefficients are then applied to raw data acquired during subsequent parameter sweeps. A fit correction to cavity displacement can be applied which accounts for aging effects or initial environmental parameters, such as temperature. Aging and environment parameter effects on cavity displacement are modeled similarly to the effects on the source wavelength with an exponential dependence. An optional dual inversion step may take place to further improve displacement accuracy and/or convergence to a solution. The result of this process is the absolute displacement of the sense cavity, which is then related to acceleration.

An example of one method for measuring acceleration using multiple stages is now presented. A first stage calls for using a reference cavity comprising an optical medium and a first fixed reflecting surface and a second fixed reflecting surface disposed a distance $d_{REF}$ from the first fixed reflecting surface. A second stage calls for using a sense cavity comprising the optical medium and a fixed reflecting surface and a non-fixed reflecting surface disposed a distance $d_{SENSE}$ from the fixed reflecting surface, the non-fixed reflecting surface being configured to be displaced when subject to an acceleration force. A third stage calls for illuminating the reference cavity and the sense cavity with a light source that is configured to emit light at one or more wavelengths. A fourth stage calls for varying a wavelength of light emitted by the light source and/or an index of refraction of the optical medium with a controller. A fifth stage calls for detecting light emitted by the reference cavity and the sense cavity using a photodetector. A sixth stage calls for measuring with an interferometer sensor using the light detected by the photodetector, for each variation of the wavelength of light emitted by the light source and/or the index of refraction of the optical medium, (a) a reference displacement of the first fixed reflecting surface with respect to the second fixed reflecting surface in the reference cavity and (b) a sense displacement of the fixed reflecting surface with respect to the non-fixed reflecting surface in the sense cavity. A seventh stage calls for calculating with a processor the acceleration using each of the reference displacements and the sense displacements. The example method may also include calculating a ratio of the estimated sense cavity length to the estimated reference cavity length and minimizing a variance of all the ratios for each swept wavelength and/or index of refraction.

The example method may also include applying a stimulus force of known magnitude to the sense cavity, receiving a reference response, and using the reference response in calculating the acceleration. The example method may also include inverting light intensity data to provide fit coefficients for an equation describing the reference displacement and the sense displacement as part of the calculating in the sixth stage.

It can be appreciated that the interferometric accelerometer system 7 in addition to being used downhole may also be configured to be used at the surface of the earth for gravity and/or seismic measurements. Further, the accelerometer system 7 may be used in marine applications such as aboard a ship or on the sea floor.

Set forth below are some embodiments of the foregoing disclosure:

Embodiment 1

An apparatus for measuring acceleration, the apparatus comprising: a reference cavity comprising an optical medium and a first fixed reflecting surface and a second fixed reflecting surface disposed a distance dREF from the first fixed reflecting surface; a sense cavity comprising the optical medium and a fixed reflecting surface and a non-fixed reflecting surface disposed a distance dSENSE from the fixed reflecting surface, the non-fixed reflecting surface being configured to be displaced when subject to an acceleration force; a light source configured to illuminate the reference cavity and the sense cavity; a controller configured to vary a wavelength of light emitted by the light source and/or an index of refraction of the optical medium; a photodetector configured to detect light emitted by the reference cavity and the sense cavity; an interferometer sensor configured to measure using the light detected by the photodetector, for each variation of the wavelength of light emitted by the light source and/or the index of refraction of the optical medium, (a) a reference displacement of the first fixed reflecting surface with respect to the second fixed reflecting surface in the reference cavity and (b) a sense displacement of the fixed reflecting surface with respect to the non-fixed reflecting surface in the sense cavity; and a processor configured to calculate the acceleration using each of the reference displacements and the sense displacements.

Embodiment 2

The apparatus according to claim 1, further comprising a control volume containing the reference cavity and the sense cavity and configured to maintain the same environment for the reference and sense cavities.

Embodiment 3

The apparatus according to claim 2, further comprising a reference sensor configured to sense an environmental parameter of the control volume, wherein the processor is further configured to use the sensed environmental parameter to calculate the acceleration.

Embodiment 4

The apparatus according to claim 1, further comprising a reference cavity housing configured to house the reference cavity.

Embodiment 5

The apparatus according to claim 1, further comprising a sense cavity housing configured to house the sense cavity.

Embodiment 6

The apparatus according to claim 5, further comprising a spring device coupling the non-fixed reflecting surface to the sense cavity housing.

Embodiment 7

The apparatus according to claim 1, further comprising a wavelength tuning controller configured to vary a wavelength of light emitted by the light source.

Embodiment 8

The apparatus according to claim 1, further comprising an optical medium disposed within reflecting surfaces within the reference cavity and the sense cavity with the optical medium being the same within each of the reference cavity and the sense cavity.

Embodiment 9

The apparatus according to claim 8, further comprising a refractive index tuning controller configured to vary the refractive index of the optical medium.

Embodiment 10

The apparatus according to claim 9, wherein the refractive index tuning controller is configured to vary the pressure of the optical medium in order to vary the refractive index of the optical medium.

Embodiment 11

The apparatus according to claim 8, further comprising a reference sensor configured to sense a parameter of the optical medium.

Embodiment 12

The apparatus according to claim 11, wherein the parameter comprises at least one of pressure and temperature.

Embodiment 13

The apparatus according to claim 1, further comprising a calibrator configured to provide a stimulus of known magnitude to the sense cavity and wherein the processor is further configured to calibrate the apparatus based on a response to the stimulus.

Embodiment 14

The apparatus according to claim 1, further comprising a carrier upon which the reference cavity and the sense cavity are disposed, the carrier being configured to be conveyed through a borehole penetrating the earth.

Embodiment 15

The apparatus according to claim 1, further comprising a gas cell configured to provide a reference wavelength of light to the light source.

Embodiment 16

The apparatus according to claim 1, wherein the acceleration is gravitational acceleration.

Embodiment 17

The apparatus according to claim 1, wherein the processor is further configured to for each swept wavelength and/or index of refraction to compute a ratio of the estimated sense cavity length to the estimated reference cavity length and minimize a variance of all the ratios.

Embodiment 18

A downhole apparatus for measuring acceleration, the downhole apparatus comprising: a carrier configured to be conveyed through a borehole penetrating the earth; a control volume disposed on the carrier; a reference cavity disposed in the control volume and comprising an optical medium and a first fixed reflecting surface and a second fixed reflecting surface disposed a distance dREF from the first fixed reflecting surface; a sense cavity disposed in the control volume and comprising the optical medium and a fixed reflecting surface and a non-fixed reflecting surface disposed a distance dSENSE from the fixed reflecting surface, the non-fixed reflecting surface being configured to be displaced when subject to an acceleration force; a laser light source configured to illuminate the reference cavity and the sense cavity; a photodetector configured to detect light emitted by the reference cavity and the sense cavity; a gas cell configured to provide a reference wavelength of light to the laser light source; a master clock configured to output a master time signal; a synchronous controller configured to (a) vary a wavelength of light emitted by the light source and/or an index of refraction of the optical medium and (b) synchronize with the master time signal; a plurality of reference sensors configured to sense properties of the control volume; a calibrator configured to apply a stimulus of known magnitude to the sense cavity that results in a change in dSENSE for providing a calibration response; an interferometer sensor configured to measure using the light detected by the photodetector, for each variation of the wavelength of light emitted by the light source and/or the index of refraction of the optical medium, (a) a reference displacement of the first fixed reflecting surface with respect to the second fixed reflecting surface in the reference cavity and (b) a sense displacement of the fixed reflecting surface with respect to the non-fixed reflecting surface in the sense cavity; a synchronous processor configured to (a) synchronize with the master time signal, (b) calculate the acceleration using each of the first displacements and the second displacements, the properties sensed by the reference sensors, and the calibration response; memory configured to store the calculated acceleration; and a communication device configured to transmit the calculated acceleration stored in the memory uphole towards the surface of the earth.

Embodiment 19

A method for measuring acceleration, the method comprising: using a reference cavity comprising an optical medium and a first fixed reflecting surface and a second fixed reflecting surface disposed a distance dREF from the first fixed reflecting surface; using a sense cavity comprising the optical medium and a fixed reflecting surface and a non-fixed reflecting surface disposed a distance dSENSE from the fixed reflecting surface, the non-fixed reflecting surface being configured to be displaced when subject to an acceleration force; illuminating the reference cavity and the sense cavity with a light source that is configured to emit light at one or more wavelengths; varying a wavelength of light emitted by the light source and/or an index of refraction of the optical medium with a controller; detecting light emitted by the reference cavity and the sense cavity using a photodetector; measuring with an interferometer sensor using the light detected by the photodetector, for each variation of the wavelength of light emitted by the light source and/or the index of refraction of the optical medium, (a) a reference displacement of the first fixed reflecting surface with respect to the second fixed reflecting surface in the reference cavity and (b) a sense displacement of the fixed reflecting surface with respect to the non-fixed reflecting surface in the sense cavity; and calculating with a processor the acceleration using each of the reference displacements and the sense displacements.

Embodiment 20

The method according to claim 19, further comprising applying a stimulus force of known magnitude to the sense cavity, receiving a reference response, and using the reference response in calculating the acceleration.

Embodiment 21

The method according to claim 19, wherein calculating comprises inverting light intensity data to provide fit coefficients for an equation describing the reference displacement and the sense displacement.

Embodiment 22

The method according to claim 19, further comprising conveying a carrier through a borehole penetrating the earth, the reference cavity and the sense cavity being disposed on the carrier.

Embodiment 23

The method according to claim 19, wherein the acceleration is gravitational acceleration.

Embodiment 24

The method according to claim 19, further comprising calculating a ratio of the estimated sense cavity length to the estimated reference cavity length for each swept wavelength and/or index of refraction, minimizing a variance of all the ratios, and computing a least-square estimate of the ratio of the estimated sense cavity length to the reference cavity length, wherein calculating comprises using the least-square estimate of the ratio.

Embodiment 25

The method according to claim 19, further comprising: calculating estimates of the sense cavity length for each swept wavelength and/or index of refraction and minimizing a variance of all the estimates and computing a least-square estimate of the sense cavity length; calculating estimates of the reference cavity length for each swept wavelength and/or index of refraction and minimizing a variance of all the estimates and computing a least-square estimate of the reference cavity length; and computing a ratio of the least-square estimated sense cavity length to the least-square reference cavity length; wherein calculating comprises using the ratio of the least-square estimated sense cavity length to the least-square reference cavity length.

Embodiment 26

The method according to claim 19, further comprising using one or more global optimization techniques to resolve calibration parameters for measurements of known values for non-linear raw output data of an apparatus comprising the reference cavity, the sense cavity, the light source, the controller, the photodetector, the interferometer sensor, and the processor.

Embodiment 27

The method according to claim 26, further comprising using the one or more global optimization techniques to interpret non-linear raw output data from measurements of unknown values with the apparatus.

Embodiment 28

The method according to claim 27, wherein using the one or more global optimization techniques comprises: applying a global optimization technique to identify a local region where a global minimum is located; and applying an optimization technique to identify a local minimum solution within the identified local region.

Embodiment 29

The method according to claim 28, wherein the acceleration is gravitational acceleration and the apparatus is a gravimeter.

In support of the teachings herein, various analysis components may be used, including a digital and/or an analog system. For example, the downhole electronics 8, the surface computer processing system 9, the laser source 51, the master clock 91, the synchronous controller 92, the synchronous processor 93, the calibrator 94, the memory 95, the communication device 96, the interferometer sensor 97, the variable parameter controller 99 and/or the reference sensors 98 may include digital and/or analog systems. The system may have components such as a processor, storage media, memory, input, output, communications link (wired, wireless, optical, mud-pulse or other), user interfaces (e.g., a display or printer), software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling component, heating component, magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

The term "carrier" as used herein means any device, device component, combination of devices, media and/or member that may be used to convey, house, support or otherwise facilitate the use of another device, device component, combination of devices, media and/or member. Other exemplary non-limiting carriers include drill strings of the coiled tube type, of the jointed pipe type and any combination or portion thereof. Other carrier examples include casing pipes, wirelines, wireline sondes, slickline sondes, drop shots, bottom-hole-assemblies, drill string inserts, modules, internal housings and substrate portions thereof.

Elements of the embodiments have been introduced with either the articles "a" or "an." The articles are intended to mean that there are one or more of the elements. The terms "including" and "having" and the like are intended to be inclusive such that there may be additional elements other than the elements listed. The conjunction "or" when used with a list of at least two terms is intended to mean any term or combination of terms. The term "configured" relates one or more structural limitations of a device that are required for the device to perform the function or operation for which the device is configured.

The flow diagram depicted herein is just an example. There may be many variations to this diagram or the steps (or operations) described therein without departing from the spirit of the invention. For instance, the steps may be performed in a differing order, or steps may be added, deleted or modified. All of these variations are considered a part of the claimed invention.

While one or more embodiments have been shown and described, modifications and substitutions may be made thereto without departing from the spirit and scope of the invention. Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for measuring acceleration, the apparatus comprising:

a reference cavity comprising an optical medium and a first fixed reflecting surface and a second fixed reflecting surface disposed a distance $d_{REF}$ from the first fixed reflecting surface;

a sense cavity comprising the optical medium and a fixed reflecting surface and a non-fixed reflecting surface disposed a distance $d_{SENSE}$ from the fixed reflecting surface, the non-fixed reflecting surface being configured to be displaced when subject to an acceleration force, wherein the reference cavity and the sense cavity are disposed in a same environment;

a light source configured to illuminate the reference cavity and the sense cavity;

a controller configured to vary a wavelength of light emitted by the light source and/or an index of refraction of the optical medium;

a photodetector configured to detect light emitted by the reference cavity and the sense cavity;

an interferometer sensor configured to measure using the light detected by the photodetector, for each variation of the wavelength of light emitted by the light source and/or the index of refraction of the optical medium, (a) a reference displacement of the first fixed reflecting surface with respect to the second fixed reflecting surface in the reference cavity and (b) a sense displacement of the fixed reflecting surface with respect to the non-fixed reflecting surface in the sense cavity; and a processor configured to calculate the acceleration using each of the reference displacements and the sense displacements.

2. The apparatus according to claim 1, further comprising a control volume containing the reference cavity and the sense cavity and configured to maintain the same environment for the reference and sense cavities.

3. The apparatus according to claim 2, further comprising a reference sensor configured to sense an environmental parameter of the control volume, wherein the processor is further configured to use the sensed environmental parameter to calculate the acceleration.

4. The apparatus according to claim 1, further comprising a reference cavity housing configured to house the reference cavity.

5. The apparatus according to claim 1, further comprising a sense cavity housing configured to house the sense cavity.

6. The apparatus according to claim 5, further comprising a spring device coupling the non-fixed reflecting surface to the sense cavity housing.

7. The apparatus according to claim 1, further comprising a wavelength tuning controller configured to vary a wavelength of light emitted by the light source.

8. The apparatus according to claim 1, further comprising an optical medium disposed within reflecting surfaces within the reference cavity and the sense cavity with the optical medium being the same within each of the reference cavity and the sense cavity.

9. The apparatus according to claim 8, further comprising a refractive index tuning controller configured to vary the refractive index of the optical medium.

10. The apparatus according to claim 9, wherein the refractive index tuning controller is configured to vary the pressure of the optical medium in order to vary the refractive index of the optical medium.

11. The apparatus according to claim 8, further comprising a reference sensor configured to sense a parameter of the optical medium.

12. The apparatus according to claim 11, wherein the parameter comprises at least one of pressure and temperature.

13. The apparatus according to claim 1, further comprising a calibrator configured to provide a stimulus of known magnitude to the sense cavity and wherein the processor is further configured to calibrate the apparatus based on a response to the stimulus.

14. The apparatus according to claim 1, further comprising a carrier upon which the reference cavity and the sense cavity are disposed, the carrier being configured to be conveyed through a borehole penetrating the earth.

15. The apparatus according to claim 1, further comprising a gas cell configured to provide a reference wavelength of light to the light source.

16. The apparatus according to claim 1, wherein the acceleration is gravitational acceleration.

17. The apparatus according to claim 1, wherein the processor is further configured to for each swept wavelength and/or index of refraction to compute a ratio of the estimated sense cavity length to the estimated reference cavity length and minimize a variance of all the ratios.

18. A downhole apparatus for measuring acceleration, the downhole apparatus comprising:

a carrier configured to be conveyed through a borehole penetrating the earth;

a control volume disposed on the carrier;

a reference cavity disposed in the control volume and comprising an optical medium and a first fixed reflecting surface and a second fixed reflecting surface disposed a distance $d_{REF}$ from the first fixed reflecting surface;

a sense cavity disposed in the control volume and comprising the optical medium and a fixed reflecting surface and a non-fixed reflecting surface disposed a distance $d_{SENSE}$ from the fixed reflecting surface, the non-fixed reflecting surface being configured to be displaced when subject to an acceleration force;

a laser light source configured to illuminate the reference cavity and the sense cavity;

a photodetector configured to detect light emitted by the reference cavity and the sense cavity;

a gas cell configured to provide a reference wavelength of light to the laser light source;

a master clock configured to output a master time signal;

a synchronous controller configured to (a) vary a wavelength of light emitted by the light source and/or an index of refraction of the optical medium and (b) synchronize with the master time signal;

a plurality of reference sensors configured to sense properties of the control volume;

a calibrator configured to apply a stimulus of known magnitude to the sense cavity that results in a change in $d_{SENSE}$ for providing a calibration response;

an interferometer sensor configured to measure using the light detected by the photodetector, for each variation of the wavelength of light emitted by the light source and/or the index of refraction of the optical medium, (a) a reference displacement of the first fixed reflecting surface with respect to the second fixed reflecting surface in the reference cavity and (b) a sense displacement of the fixed reflecting surface with respect to the non-fixed reflecting surface in the sense cavity;

a synchronous processor configured to (a) synchronize with the master time signal, (b) calculate the acceleration using each of the first displacements and the second displacements, the properties sensed by the reference sensors, and the calibration response;

memory configured to store the calculated acceleration; and a communication device configured to transmit the calculated acceleration stored in the memory uphole towards the surface of the earth.

19. A method for measuring acceleration, the method comprising:

using a reference cavity comprising an optical medium and a first fixed reflecting surface and a second fixed reflecting surface disposed a distance $d_{REF}$ from the first fixed reflecting surface;

using a sense cavity comprising the optical medium and a fixed reflecting surface and a non-fixed reflecting surface disposed a distance $d_{SENSE}$ from the fixed reflecting surface, the non-fixed reflecting surface being configured to be displaced when subject to an acceleration force, wherein the reference cavity and the sense cavity are disposed in a same environment;

illuminating the reference cavity and the sense cavity with a light source that is configured to emit light at one or more wavelengths;

varying a wavelength of light emitted by the light source and/or an index of refraction of the optical medium with a controller;

detecting light emitted by the reference cavity and the sense cavity using a photodetector;

measuring with an interferometer sensor using the light detected by the photodetector, for each variation of the wavelength of light emitted by the light source and/or the index of refraction of the optical medium, (a) a reference displacement of the first fixed reflecting surface with respect to the second fixed reflecting surface in the reference cavity and (b) a sense displacement of the fixed reflecting surface with respect to the non-fixed reflecting surface in the sense cavity; and calculating with a processor the acceleration using each of the reference displacements and the sense displacements.

20. The method according to claim 19, further comprising applying a stimulus force of known magnitude to the sense cavity, receiving a reference response, and using the reference response in calculating the acceleration.

21. The method according to claim 19, wherein calculating comprises inverting light intensity data to provide fit coefficients for an equation describing the reference displacement and the sense displacement.

22. The method according to claim 19, further comprising conveying a carrier through a borehole penetrating the earth, the reference cavity and the sense cavity being disposed on the carrier.

23. The method according to claim 19, wherein the acceleration is gravitational acceleration.

24. The method according to claim 19, further comprising calculating a ratio of the estimated sense cavity length to the estimated reference cavity length for each swept wavelength and/or index of refraction, minimizing a variance of all the ratios, and computing a least-square estimate of the ratio of the estimated sense cavity length to the reference cavity length, wherein calculating comprises using the least-square estimate of the ratio.

25. The method according to claim 19, further comprising:

calculating estimates of the sense cavity length for each swept wavelength and/or index of refraction and minimizing a variance of all the estimates and computing a least-square estimate of the sense cavity length;

calculating estimates of the reference cavity length for each swept wavelength and/or index of refraction and minimizing a variance of all the estimates and computing a least-square estimate of the reference cavity length; and computing a ratio of the least-square estimated sense cavity length to the least-square reference cavity length;

wherein calculating comprises using the ratio of the least-square estimated sense cavity length to the least-square reference cavity length.

26. The method according to claim 19, further comprising using one or more global optimization techniques to resolve calibration parameters for measurements of known values for non-linear raw output data of an apparatus comprising the reference cavity, the sense cavity, the light source, the controller, the photodetector, the interferometer sensor, and the processor.

27. The method according to claim 26, further comprising using the one or more global optimization techniques to interpret non-linear raw output data from measurements of unknown values with the apparatus.

28. The method according to claim 27, wherein using the one or more global optimization techniques comprises:

applying a global optimization technique to identify a local region where a global minimum is located; and applying an optimization technique to identify a local minimum solution within the identified local region.

29. The method according to claim 28, wherein the acceleration is gravitational acceleration and the apparatus is a gravimeter.

* * * * *